(12) United States Patent
Furuichi

(10) Patent No.: US 11,546,776 B2
(45) Date of Patent: Jan. 3, 2023

(54) DEVICE AND METHOD FOR BALANCING FREQUENCY AND NETWORK RESOURCES

(71) Applicant: SONY CORPORATION, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/489,026

(22) PCT Filed: Jan. 5, 2018

(86) PCT No.: PCT/JP2018/000106
§ 371 (c)(1),
(2) Date: Aug. 27, 2019

(87) PCT Pub. No.: WO2018/173418
PCT Pub. Date: Sep. 27, 2018

(65) Prior Publication Data
US 2020/0008070 A1    Jan. 2, 2020

(30) Foreign Application Priority Data
Mar. 23, 2017    (JP) .............................. JP2017-057783

(51) Int. Cl.
*H04W 16/14*    (2009.01)
*H04W 24/08*    (2009.01)
(Continued)

(52) U.S. Cl.
CPC ........... *H04W 16/14* (2013.01); *H04W 24/08* (2013.01); *H04W 24/10* (2013.01); *H04W 72/0453* (2013.01)

(58) Field of Classification Search
CPC ..... H04W 16/14; H04W 24/08; H04W 24/10; H04W 72/0453; H04W 72/00
See application file for complete search history.

(56) References Cited

U.S. PATENT DOCUMENTS

| 7,542,779 B2 | 6/2009 | Halonen et al. |
| 8,355,722 B1 | 1/2013 | Tailor et al. |
(Continued)

FOREIGN PATENT DOCUMENTS

| CN | 1468500 A | 1/2004 |
| JP | 2004-511986 A | 4/2004 |
(Continued)

OTHER PUBLICATIONS

Adjakple et al. "Architecture Aspects and QOS for Next Generation Mobile Telecommunication Systems", U.S. Appl. No. 62/410,049, filed Oct. 19, 2016 (Year: 2016).*

Li et al., "Grant-Less Uplink Transmission for New Radio", U.S. Appl. No. 62/350,550, filed Jun. 15, 2016 (Year: 2016).*

"Further Considerations on Cell Reselection", 3GPP TSG RAN WG2#97, Athens, Greece, R2-1701725, Feb. 13-17, 2017, 03 pages.
(Continued)

*Primary Examiner* — Thinh D Tran
(74) *Attorney, Agent, or Firm* — Chip Law Group

(57) ABSTRACT

Provided is a mechanism capable of sharing frequency resources and network resources while balancing each other. Provided is a device including: a determination unit that determines one of a use setting of a frequency resources by a wireless communication device, and a use setting of a network resource by a logical network deployed on a physical network to which the wireless communication device connects, for providing a wireless communication service by the wireless communication device; and a request unit that requests another device to determine a use setting of a resource that is not determined on the basis of a determination result by the determination unit.

22 Claims, 9 Drawing Sheets

(51) Int. Cl.
*H04W 24/10* (2009.01)
*H04W 72/04* (2009.01)

(56) References Cited

U.S. PATENT DOCUMENTS

| | | |
|---|---|---|
| 2001/0032262 A1 | 10/2001 | Sundqvist et al. |
| 2004/0132486 A1 | 7/2004 | Halonen et al. |
| 2011/0125905 A1 | 5/2011 | Baucke et al. |
| 2014/0080535 A1 | 3/2014 | Gauvreau et al. |
| 2014/0155118 A1 | 6/2014 | Tsuda |
| 2016/0234713 A1 | 8/2016 | Lin et al. |
| 2017/0079059 A1 | 3/2017 | Li et al. |
| 2017/0367110 A1* | 12/2017 | Li .................... H04W 74/0816 |
| 2019/0132781 A1* | 5/2019 | Arnold ................ H04W 72/087 |
| 2019/0261186 A1* | 8/2019 | Xu ........................ H04W 28/24 |
| 2019/0281503 A1* | 9/2019 | Xu ...................... H04L 41/5051 |
| 2019/0335349 A1* | 10/2019 | Vaishnavi ............. H04W 24/06 |
| 2020/0213992 A1* | 7/2020 | Hoffmann ............. H04L 5/0037 |
| 2020/0267753 A1* | 8/2020 | Adjakple .......... H04W 72/1226 |

FOREIGN PATENT DOCUMENTS

| | | |
|---|---|---|
| JP | 5679033 B2 | 3/2015 |
| RU | 2260923 C2 | 9/2005 |
| WO | 2002/032174 A1 | 4/2002 |
| WO | 2014/114163 A1 | 7/2014 |
| WO | 2016/192636 A1 | 12/2016 |

OTHER PUBLICATIONS

"RAN WG's Progress on NR technology SI in the May Meeting", Inc. 3GPP TSG-RAN WG2 #95, Gothenburg, Sweden, R2-164707, Aug. 22-26, 2016, pp. 1-9.

"Discussion on the Impact of NW Slicing on RAN Side", 3GPP TSG RAN WG2 Meeting #94, Nanjing, China, R2-163747, May 23-27, 2016, 03 pages.

"Further considerations on cell reselection", Intel Corporation, 3GPP TSG RAN WG2, 97th Meeting, Athens, Greece, Feb. 13-17, 2017, 03 pages.

"RAN WG's progress on NR technology SI in the May meeting", NTT Docomo, Inc., 3GPP TSG RAN WG2, 95th Meeting, Gothenburg, Sweden, Aug. 22-26, 2016, 09 pages.

"Discussion on the impact of NW slicing on RAN side", ZTE, 3GPP TSG RAN WG2, 94th Meeting, Nanjing, China, May 23-27, 2016, 03 pages.

"RAN WG's Progress on NR Technology SI in the May Meeting", 3GPP TSG-RAN WG2 #95, Gothenburg, Sweden, R2-164707, Aug. 22-26, 2016, pp. 1-9.

International Search Report and Written Opinion of PCT Application No. PCT/JP2018/000106, dated Mar. 6, 2018, 09 pages of ISRWO.

Office Action for TW Patent Application No. 107108399, dated Jun. 24, 2021, 12 pages of Office Action.

Office Action for RU Patent Application No. 2019129024 dated May 18, 2021.

\* cited by examiner

DEVICE AND METHOD FOR BALANCING FREQUENCY AND NETWORK RESOURCES

CROSS REFERENCE TO RELATED APPLICATIONS

This application is a U.S. National Phase of International Patent Application No. PCT/JP2018/000106 filed on Jan. 5, 2018, which claims priority benefit of Japanese Patent Application No. JP 2017-057783 filed in the Japan Patent Office on Mar. 23, 2017. Each of the above-referenced applications is hereby incorporated herein by reference in its entirety.

TECHNICAL FIELD

The present disclosure relates to a device, a method, and a recording medium.

BACKGROUND ART

Radio access scheme for cellular mobile communication and radio network (hereinafter, also referred to as "long term evolution (LTE)", "LTE-advanced (LTE-A)", "LTE-advanced pro (LTE-A Pro)", "fifth generation (5G)", "new radio (NR)", "new radio access technology (NRAT)", "evolved universal terrestrial radio access (EUTRA)", or "further EUTRA (FEUTRA)", have been considered in the 3rd generation partnership project (3GPP). Note that, in the following description, the LTE includes the LTE-A, the LTE-A Pro, and the EUTRA, and the NR includes the NRAT and the FEUTRA. In the LTE and the NR, a base station device (base station) is also referred to as an evolved Node B (eNodeB), and a terminal device (mobile station, mobile station device, terminal) is also referred to as a user equipment (UE). The LTE and the NR are cellular communication systems in which a plurality of areas covered by the base station device is arranged in a cell. A single base station device may manage a plurality of cells.

The NR is a radio access technology (RAT) different from the LTE as a next-generation radio access scheme for the LTE. The NR is an access technology that can support various use cases including the enhanced mobile broadband (eMBB), the massive machine type communications (mMTC), and the ultra reliable and low latency communications (URLLC). The NR is considered aiming at a technical framework corresponding to use scenarios, requirements, deployment scenarios, and the like in those use cases.

For example, in the NR, a slicing technology is being considered for accommodating a plurality of forms of communication corresponding to various use cases such as low delay, high reliability, or high security in one network. According to the slicing technology, it is possible to coexist logical networks called slices or network slices in one physical network. This makes it possible to efficiently provide a network in accordance with the requirements of the service used by the user.

On the other hand, in order to secure frequency resources which are becoming increasingly severe in recent years, legislation and standardization of spectrum sharing are being promoted worldwide. For example, in the United States in recent years, citizens broadband radio service (CBRS) utilizing a frequency sharing technology is legalized to aim to open the federal use band (3.55 to 3.70 GHz) overlapping the frequency band that is worldwide 3GPP band 42, 43 to the general public, and standardization thereof is accelerating. Note that, at this point, it is assumed that LTE will be the mainstream as a radio access scheme to be operated.

With regard to frequency sharing technology, many techniques have been developed for efficiently using frequency resources. For example, in Patent Document 1 below, a technology is disclosed in which, among frequency resources corresponding to position information, frequency resources according to communication demand are used by a user.

CITATION LIST

Patent Document

Patent Document 1: Japanese Patent No. 5679033

SUMMARY OF THE INVENTION

Problems to be Solved by the Invention

The frequency sharing technology and the slicing technology may be combined to operate a wireless communication system. In that case, it is assumed that a communication carrier provides the wireless communication service to a user while sharing frequency resources and resources of a network such as a core network with other communication carriers.

Since network resources as well as frequency resources are limited, it is desirable to operate network resources efficiently in order to make various slices coexist. Moreover, it is desirable that efficient sharing of frequency resources and network resources be realized together.

Thus, the present disclosure provides a mechanism capable of sharing frequency resources and network resources while balancing each other.

Solutions to Problems

According to the present disclosure, provided is a device including: a determination unit that determines one of a use setting of a frequency resource by a wireless communication device, and a use setting of a network resource by a logical network deployed on a physical network to which the wireless communication device connects, for providing a wireless communication service by the wireless communication device; and a request unit that requests another device to determine a use setting of a resource that is not determined on the basis of a determination result by the determination unit.

Furthermore, according to the present disclosure, provided is a device including: an acquisition unit that acquires information indicating a determination result of one of a use setting of a frequency resource by a wireless communication device, and a use setting of a network resource by a logical network deployed on a physical network to which the wireless communication device connects, for providing a wireless communication service by the wireless communication device; and a determination unit that determines a use setting of a resource that is not determined on the basis of the information acquired by the acquisition unit.

Furthermore, according to the present disclosure, provided is a method including: determining, by a processor, one of a use setting of a frequency resource by a wireless communication device, and a use setting of a network resource by a logical network deployed on a physical network to which the wireless communication device connects, for providing a wireless communication service by the wireless communication device; and requesting another device to determine a use setting of a resource that is not determined on the basis of a determination result.

Furthermore, according to the present disclosure, provided is a method including: acquiring information indicating a determination result of one of a use setting of a frequency resource by a wireless communication device, and a use setting of a network resource by a logical network deployed on a physical network to which the wireless communication device connects, for providing a wireless communication service by the wireless communication device; and determining, by a processor, a use setting of a resource that is not determined on the basis of the information acquired.

Furthermore, according to the present disclosure, provided is a recording medium in which a program is recorded, the program causing a computer to function as: a determination unit that determines one of a use setting of a frequency resource by a wireless communication device, and a use setting of a network resource by a logical network deployed on a physical network to which the wireless communication device connects, for providing a wireless communication service by the wireless communication device; and a request unit that requests another device to determine a use setting of a resource that is not determined on the basis of a determination result by the determination unit.

Furthermore, according to the present disclosure, provided is a recording medium in which a program is recorded, the program causing a computer to function as: an acquisition unit that acquires information indicating a determination result of one of a use setting of a frequency resource by a wireless communication device, and a use setting of a network resource by a logical network deployed on a physical network to which the wireless communication device connects, for providing a wireless communication service by the wireless communication device; and a determination unit that determines a use setting of a resource that is not determined on the basis of information acquired by the acquisition unit.

According to the present disclosure, one of the use setting of the frequency resource and the use setting of the network resource for providing the wireless communication service by the wireless communication device is first determined. Then, the use setting of the another resource is determined on the basis of determination result of the one resource. As a result, the use settings of the frequency resource or the network resource are determined on the basis of the determination result of the use setting each other. In this way, it is possible to determine the use settings of the frequency resource and network resource balanced with each other.

Effects of the Invention

As described above, according to the present disclosure, provided is a mechanism capable of sharing frequency resources and network resources while balancing each other. Note that the effect described above is not necessarily limitative, and any of the effects shown in the present specification or other effects that can be understood from the present specification may be exhibited together with the effect described above, or instead of the effect described above.

MODE FOR CARRYING OUT THE INVENTION

Figure 1:
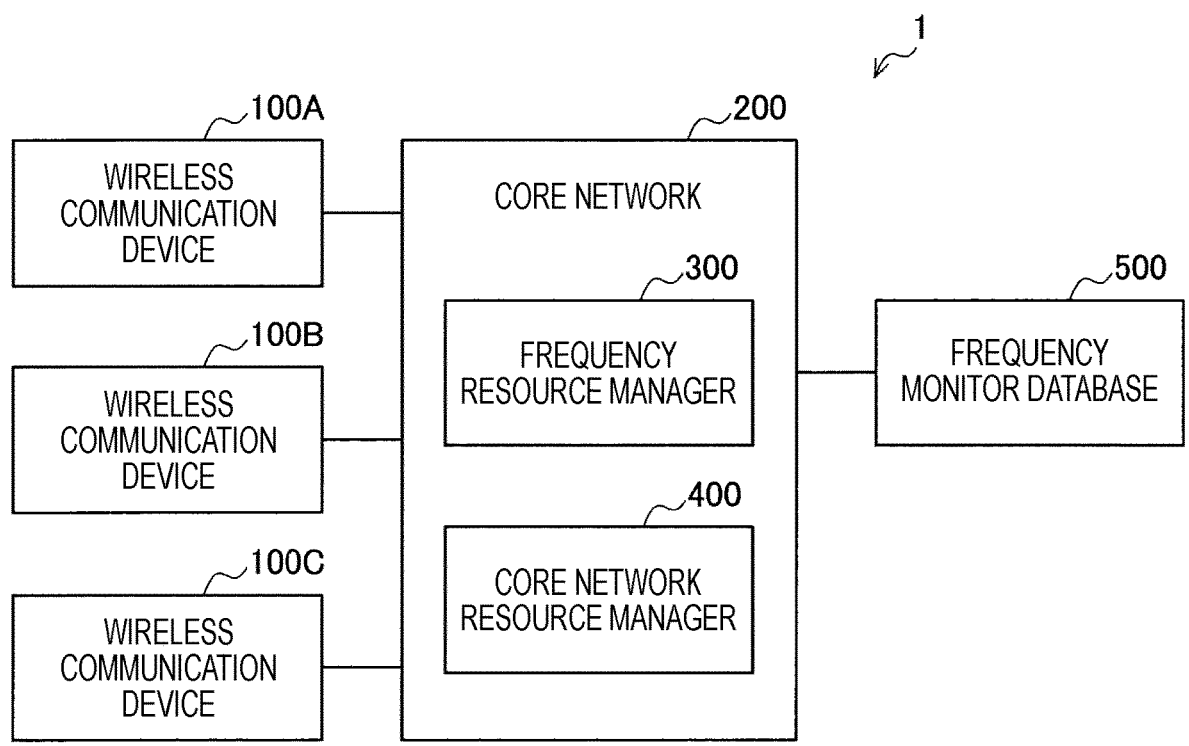
FIG. 1 is a diagram showing an example of a system architecture according to an embodiment of the present disclosure.

Preferred embodiments of the present disclosure will be described in detail below with reference to the accompanying drawings. Note that, in the present specification and the drawings, the same reference numerals are given to the constituent elements having substantially the same functional configuration, and redundant explanations are omitted.

Furthermore, in this specification and the drawings, constituent elements having substantially the same functional configuration may be distinguished by attaching different alphabets after the same reference numerals. For example, a plurality of elements having substantially the same functional configuration is distinguished as wireless communication devices 100A, 100B, and 100C as necessary. However, in a case where it is not necessary to particularly distinguish each of a plurality of elements having substantially the same functional configuration, only the same reference numerals are attached. For example, in a case where it is not necessary to particularly distinguish the wireless communication devices 100A, 100B and 100C, each of the wireless communication devices 100A, 100B and 100C is simply referred to a wireless communication device 100.

Note that the description will be given in the following order.

1. Introduction
 1.1. Frequency Sharing
 1.2. Slice
 1.3. Architecture
 1.4. Technical Issues
 2. Configuration Example of Each Device
 2.1. Configuration Example of Frequency Resource Manager
 2.2. Configuration Example of Core Network Resource Manager 3. Technical Features
3.1. Allocation Procedure of Wireless Communication Device
3.2. Resource Use Setting Procedure
3.2.1. First Method
3.2.2. Second Method
3.3. Update of Use Setting
4. Application Example
5. Conclusion

1. INTRODUCTION

<1.1. Frequency Sharing>

Since frequency resources are limited, technologies for realizing efficient use of frequency resources are being studied at various places. For example, in the citizens broadband radio service (CBRS), which is legalized for the 3,550 to 3,700 MHz band in the United States, while three priorities are provided to protect the existing system (incumbent system) to which the highest priority is given, it is considered to assign a channel (in other words, frequency band) to each of wireless networks according to the priority.

Furthermore, as a proposal for realizing efficient use of frequency resources, a mechanism for making a frequency band assigned to a certain wireless network to be used by another wireless network is being considered. For example, a mechanism is being considered in which, among frequency channels allocated to a TV broadcast system, a channel not used by the TV broadcast system (also referred to as TV white space) is opened to another system to use according to the area. Such a mechanism is also referred to as secondary use of frequency. In general, a system to which frequency channels are preferentially allocated is called a primary system, and a system that uses the frequency channel secondarily is called a secondary system.

<1.2. Slice>

There are two features of NR. The first feature is to realize high-speed and large-capacity communication using a frequency band from 6 GHz to 100 GHz. The second feature is to efficiently accommodate a plurality of forms of communication for different use cases. Here, the plurality of forms of communication includes high-speed and large-capacity communication (mobile broad band), low-delay communication (low latency), machine type communication (MTC), device to device (D2D), and the like. In the NR, it is considered to accommodate these plurality of forms of communication in one network.

Although evolved packet core (EPC) is adopted in the LTE as a technology on a core network side connected to the RAN, New Core is being considered as a successor to the EPC. The New Core is required to efficiently accommodate the above-described plurality of forms of communication and to keep CAPEX/OPEX (equipment installation cost, operation cost) low.

In order to provide multiple forms of communication while keeping CAPEX/OPEX low, it is difficult to physically separate networks for each form of communication. Therefore, physically, operating a plurality of logical networks corresponding to a plurality of forms of communication in a single network, and flexibly changing the capacity of the logical network according to demand for communication amount for each communication form are being considered.

For that, considered is implementing each node (in other words, communication equipment) of the core network as a virtual machine to virtually execute the operation of the node according to the target communication form for each logical network. This is because, for the functions implemented by virtual machines, the functions can be increased or decreased according to the increase or decrease of the demand for communication, or to increase or decrease the computer resources allocated for each function. The functions implemented by the virtual machine are connected with other functions and networked by the virtual network technology. As such virtual network technology, for example, there is a technology called Open Flow in which a central controller distributes rules of each switch and the switch operates according to the rules distributed by the controller. According to the Open Flow, flexible network operation can be performed by freely switching switches connecting functions implemented by the virtual machine.

As described above, a technology that combines a virtual machine and a virtual network technology such as the Open Flow to provide logical networks (in other words, pipes for communication) having different properties is also referred to as slicing. For example, by combining a virtual machine and an open flow switch, a core network for low delay communication, a core network for the MTC, and a core network for the D2D are realized on one physical network. In other words, logically independent networks capable of providing different communication services are realized on one physical network. The logical network provided in the slicing technology is also referred to as a slice or a network slice. The slicing technology can flexibly provide logical networks with different applications. Moreover, according to the slicing technology, the capacity of each slice can be flexibly changed by increasing or decreasing the calculation resource allocated to the virtual machine or changing the switching.

<1.3. Architecture>

The architecture of a system according to an embodiment of the present disclosure will be described below with reference to FIG. 1.

FIG. 1 is a diagram showing an example of the architecture of a system 1 according to an embodiment of the present disclosure. As shown in FIG. 1, the system 1 includes a plurality of wireless communication devices 100 (100A to 100C), a core network 200, and a frequency monitor database 500.

The wireless communication device 100 is a device that provides a wireless communication service to a user. For example, the wireless communication device 100 is a base station, operates a cell, transmits a downlink signal to a user terminal in a cell, and receives an uplink signal. The wireless communication device 100 is operated on the basis of the frequency information provided from the frequency monitor database 500. The wireless communication device 100 at least includes a control unit that controls wireless parameters such as a frequency to be used and transmission power, and an antenna unit that emits radio waves according to the wireless parameters controlled by the control unit. Note that the wireless communication device 100 may be configured as physically one device, or may be configured to be physically separated like a distributed antenna system (DAS) including a remote radio head (RRH) and a control device. Note that the wireless communication device 100 may also be referred to as infrastructure.

The core network 200 is an example of a physical network to which the wireless communication device 100 is connected. For example, the core network 200 has a function of controlling communication between the wireless communication device 100 and a user terminal that enjoys the wireless communication service provided by the wireless communication device 100. Specifically, the core network 200 manages mobility of the user terminal, instructs handover, and relays transmission and reception of user data between the Internet and the user terminal. On the core network 200, one or more slices (in other words, logical networks) may be deployed. The resource of the core network 200 (in other words, network resource) is also referred to below as a core network resource. Specifically, the core network resource includes a computer resource of various devices forming the core network 200, a storage resource, a physical line resource between devices, or the like. The slice operates using allocated core network resources.

As shown in FIG. 1, the core network 200 includes a frequency resource manager 300 and a core network resource manager 400. Each of the frequency resource manager 300 and the core network resource manager 400 may be configured as physically one device or may be deployed on a plurality of devices. Furthermore, the frequency resource manager 300 and the core network resource manager 400 may be implemented logically separately in the same device.

The frequency resource manager 300 accesses the frequency monitor database 500 to acquire information of available frequency. Furthermore, the frequency resource manager 300 allocates available frequency to each wireless communication device 100 so that harmful interference is not given mutually among the plurality of wireless communication devices 100. Such frequency utilization adjustment function can be provided by spectrum coordinator (SC) standardized by ETSI EN 303 145 and ETSI EN 303 387. Furthermore, such frequency utilization adjustment function may be provided by IEEE 802.19.1-2014 or IEEE P802.19.1a during standardization work.

The core network resource manager 400 controls the core network resource used for the operation of the slice deployed on the core network 200. The control of the resource by the core network resource manager 400 is performed, for example, by increasing or decreasing the calculation resources allocated to the virtual machine, or changing the switching.

The frequency monitor database 500 is an entity that performs monitoring (management) related to frequency sharing. The frequency monitor database 500 has a role of providing the wireless communication device 100 with a frequency that does not give harmful interference and disturbance to the primary system and the maximum transmission power associated with the frequency in the frequency band in which frequency sharing is performed, and permitting emission of radio waves in the frequency band. For example, geolocation database (GLDB) used in the TV band white space (TVWS) and the spectrum access system (SAS) defined in 47C. F. R Part 96 of the United States correspond to the frequency monitor database 500.

The example of the architecture of the system 1 has been described above.

Here, although only the relationship between the entities is shown in FIG. 1, the system 1 may be shared by a plurality of communication carriers. The architecture in that case is described with reference to FIG. 2.

Figure 2:
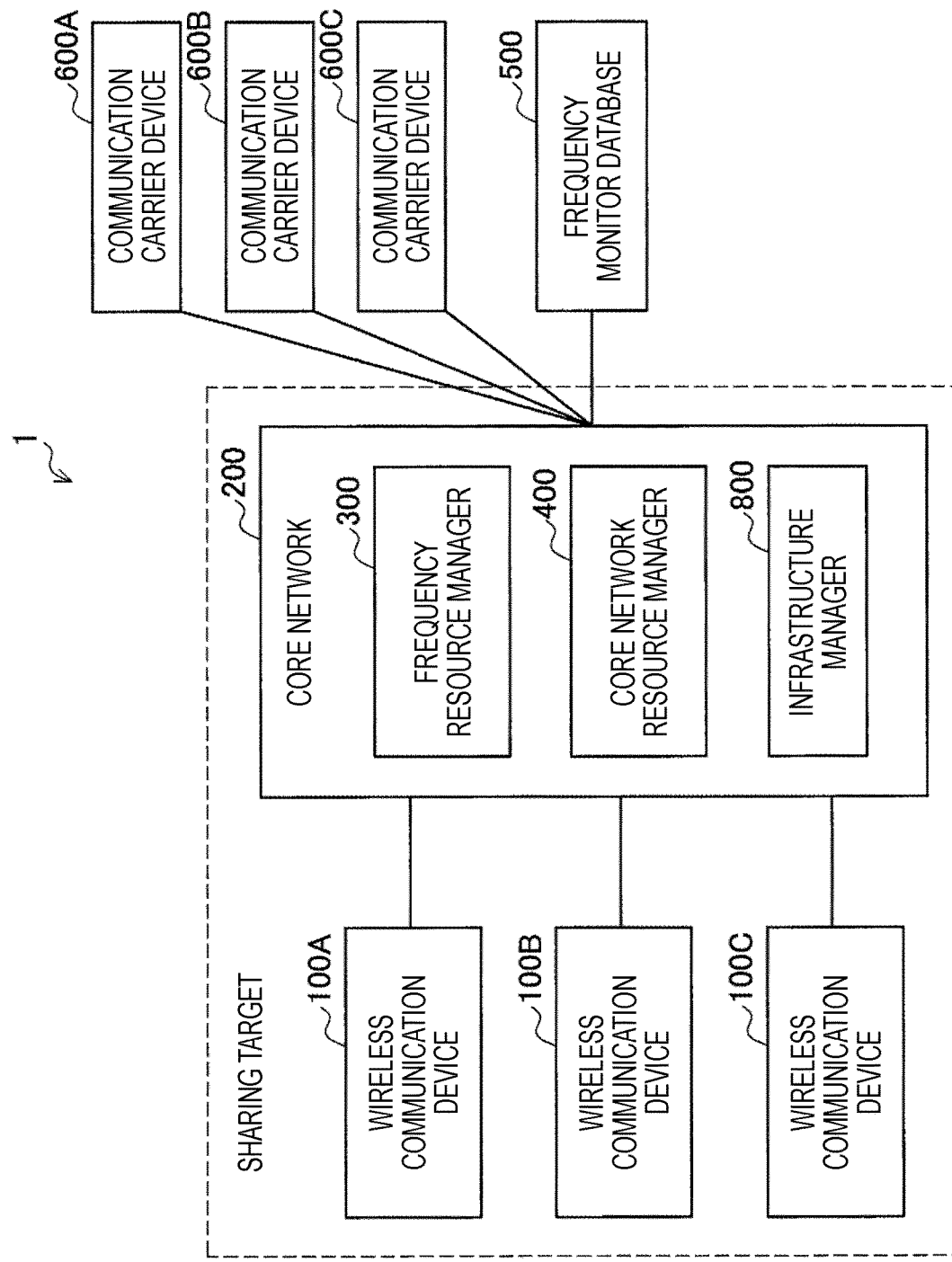
FIG. 2 is a diagram showing an example of a system architecture according to the same embodiment.

FIG. 2 is a diagram showing an example of the architecture of the system 1 according to the present embodiment. As shown in FIG. 2, in the system 1, in addition to the configuration shown in FIG. 1, the core network 200 includes an infrastructure manager 800, and a plurality of communication carrier devices 600 (600A to 600C) is connected to the core network 200.

The communication carrier device 600 is a device operated by a communication carrier, accepts an input of various types of information from the communication carrier, and outputs information to the communication carrier. Here, the communication carrier in this specification is an entity that provides wireless communication services. For example, the communication carrier may be a mobile Internet service provider (ISP) or a mobile virtual network operator (MVNO). Note that, in the following description, it is assumed that the wireless communication device 100 and the core network 200 are operated by an entity logically different from the communication carrier. Of course, at the time of implementation, there may be a communication carrier that holds a part or all of the wireless communication device 100 or a part or all of the core network 200, or there may be a communication carrier that borrows part of resources from the communication carrier that holds the resources.

As shown in FIG. 2, the wireless communication device 100 and the core network 200 are sharing targets. The wireless communication device 100 and the core network 200 may be shared by a plurality of carriers. For example, sharing of the core network 200 is realized by providing slices for individual carriers. Furthermore, sharing of the wireless communication device 100 is realized by allocating the wireless communication device 100 for each carrier. One wireless communication device 100 is typically allocated to one carrier. One wireless communication device 100 may be allocated to a plurality of carriers, in which case, for example, the frequencies used by the wireless communication device 100 may differ between the carriers.

The infrastructure manager 800 is an entity that manages sharing of the infrastructure (in other words, the wireless communication device 100) by a plurality of communication carriers. The infrastructure manager 800 can automatically or dynamically allocate and manage. Even in a case where the infrastructure is shared by a plurality of communication carriers, the infrastructure manager 800 may not be provided if it is shared in a static manner. In a case where the infrastructure manager 800 does not exist, the wireless communication device 100 may be allocated to each communication carrier on the basis of an agreement between the communication carriers or between the communication carrier and the infrastructure provider.

<1.4. Technical Issues>

Technical issues in a case where the wireless communication device 100 and the core network 200 are shared will be described below with reference to FIG. 3.

Figure 3:
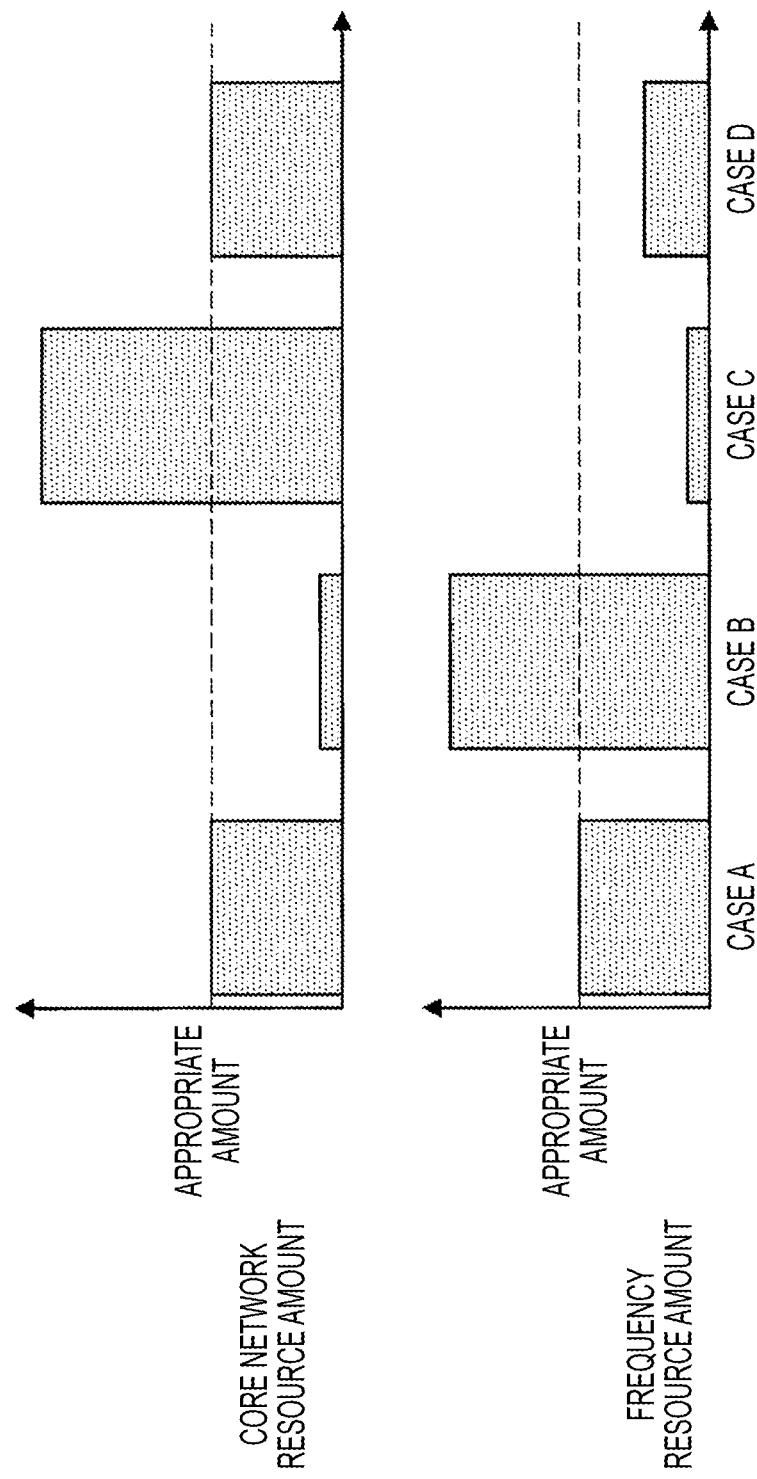
FIG. 3 is a diagram for explaining balance between frequency resources and core network resources.

FIG. 3 is a diagram for explaining balance between frequency resources and core network resources. FIG. 3 shows the amount of frequency resources and the amount of core network resources used when the communication carrier provides the wireless communication service. In the case A, the core network resources and frequency resources are allocated to the communication carrier in appropriate amounts. In the case B, the amount of core network resources is small, and the frequency resources greatly exceed the appropriate amount. In such a case, congestion may occur in the core network 200 while simultaneous access by multiple wireless communication devices is possible in the wireless section. In the case C and case D, the opposite may occur.

In the operation form in which the wireless communication device 100 and the core network 200 are shared, in a case where the frequency resources and the core network resources cannot be balanced as in the cases B to D, utilization efficiency of one or both of the resources may decreases significantly. This may cause unnecessary network operation costs.

Thus, in the following, a mechanism capable of sharing frequency resources and core network resources while balancing each other is proposed. According to such a mechanism, unnecessary allocation of resources is reduced, and too little allocation is prevented, so that resource utilization efficiency can be improved.

2. CONFIGURATION EXAMPLE OF EACH DEVICE

<2.1. Configuration Example of Frequency Resource Manager 300>

Figure 4:
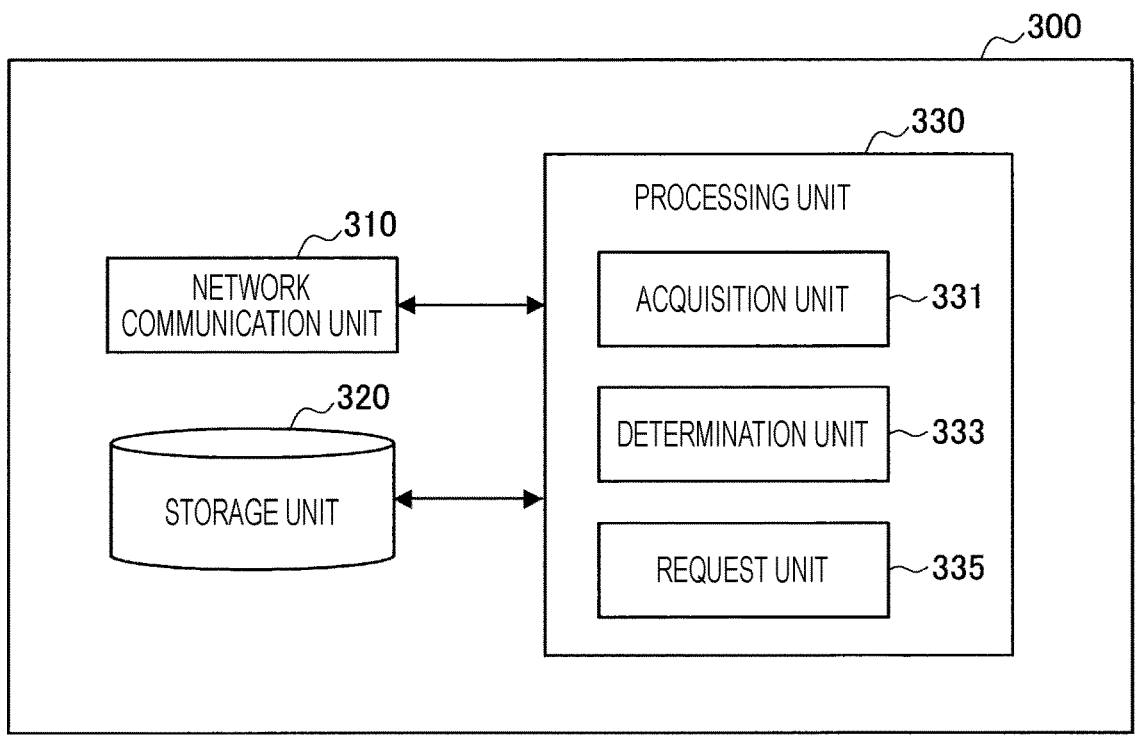
FIG. 4 is a block diagram showing an example of a configuration of a frequency resource manager according to the same embodiment.

Subsequently, an example of a configuration of a frequency resource manager 300 according to an embodiment of the present disclosure will be described with reference to FIG. 4. FIG. 4 is a block diagram showing an example of a configuration of the frequency resource manager 300 according to an embodiment of the present disclosure. Referring to FIG. 4, the frequency resource manager 300 includes a network communication unit 310, a storage unit 320, and a processing unit 330.

(1) Network Communication Unit 310

The network communication unit 310 transmits and receives signals. For example, the network communication unit 310 communicates with the wireless communication device 100, the core network resource manager 400, the frequency monitor database 500, the communication carrier device 600, or the infrastructure manager 800.

(2) Storage Unit 320

The storage unit 320 temporarily or permanently stores programs for operation of the frequency resource manager 300 and various pieces of data.

(4) Processing Unit 330

The processing unit 330 provides various functions of the frequency resource manager 300. The processing unit 330 includes an acquisition unit 331, a determination unit 333, and a request unit 335. The acquisition unit 331 has a function of acquiring from the core network resource manager 400 a request for determining the use setting of the frequency resource. The determination unit 333 has a function of determining the use setting of the frequency resource by the wireless communication device 100 for providing the wireless communication service by the wireless communication device 100. The request unit 335 has a function of requesting the core network resource manager 400 to determine the use setting of the core network resource by the slice for providing the wireless communication service by the wireless communication device 100. Note that the processing unit 330 may further include other components in addition to these components. In other words, the processing unit 330 may also perform operations other than the operations of these components.

<2.2. Configuration Example of Core Network Resource Manager 400>

Figure 5:
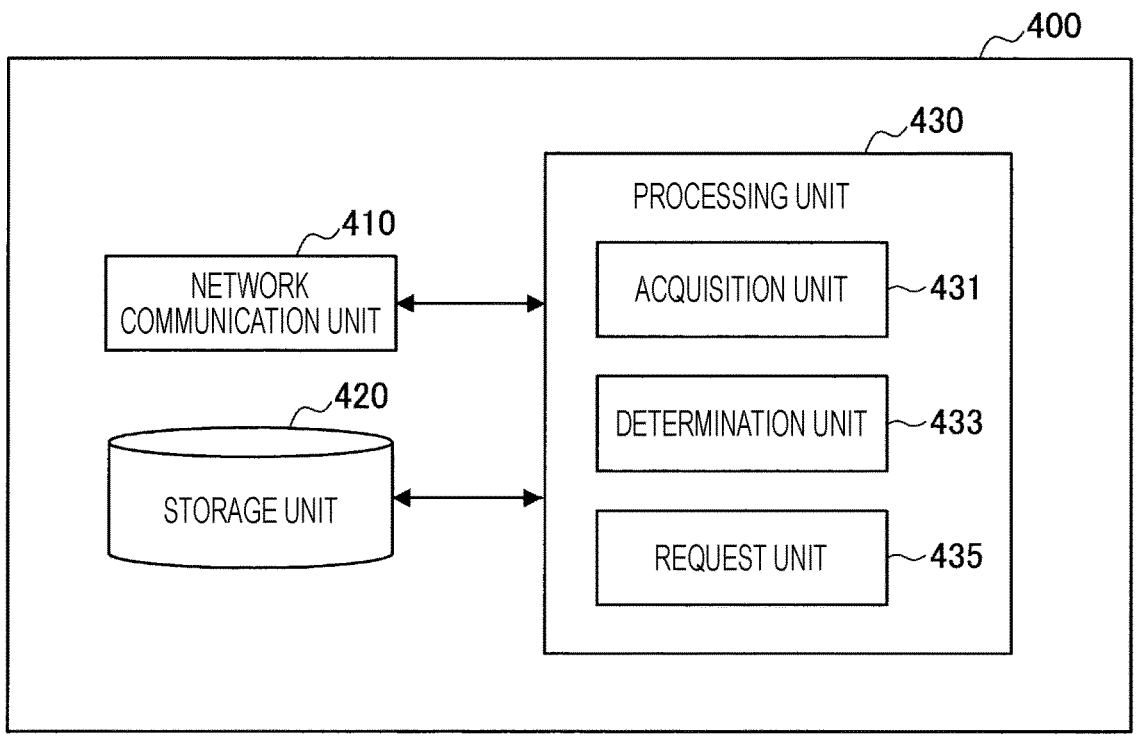
FIG. 5 is a block diagram showing an example of a configuration of a core network resource manager according to the same embodiment.

Subsequently, an example of the configuration of the core network resource manager 400 according to an embodiment of the present disclosure will be described with reference to FIG. 5. FIG. 5 is a block diagram showing an example of a configuration of the core network resource manager 400 according to an embodiment of the present disclosure. Referring to FIG. 5, the core network resource manager 400 includes a network communication unit 410, a storage unit 420, and a processing unit 430.

(1) Network Communication Unit 410

The network communication unit 410 transmits and receives signals. For example, the network communication unit 410 communicates with the wireless communication device 100, the frequency resource manager 300, the communication carrier device 600, or the infrastructure manager 800.

(2) Storage Unit 420

The storage unit 420 temporarily or permanently stores programs for operation of the core network resource manager 400 and various pieces of data.

(3) Processing Unit 430

The processing unit 430 provides various functions of the core network resource manager 400. The processing unit 430 includes an acquisition unit 431, a determination unit 433, and a request unit 435. The acquisition unit 431 has a function of acquiring from the frequency resource manager 300 a request for determining the use setting of the core network resource. The determination unit 433 has a function of determining the use setting of the core network resource by the slice for providing the wireless communication service by the wireless communication device 100. The request unit 435 has a function of requesting the frequency resource manager 300 to determine the use setting of the frequency resource by the wireless communication device 100 for providing the wireless communication service by the wireless communication device 100. Note that the processing unit 430 may further include other components in addition to these components. In other words, the processing unit 430 may also perform operations other than the operations of these components.

3. TECHNICAL FEATURES

The sharing of the wireless communication device 100 and the core network 200 by a plurality of communication carriers is realized by an allocation procedure of the wireless communication device 100 and a resource use setting procedure. The resource use setting procedure includes a frequency resource use setting procedure and a use setting procedure of the core network resource, and the order thereof is arbitrary.

<3.1. Allocation Procedure of Wireless Communication Device>

The communication carrier device 600 receives the allocation of the wireless communication device 100. For example, the infrastructure manager 800 may allocate the wireless communication device 100 to each carrier. Alternatively, the wireless communication device 100 may be allocated to each communication carrier on the basis of an agreement between the communication carriers or between the communication carrier and the infrastructure provider.

<3.2. Resource Use Setting Procedure>

The system 1 allocates frequency resources and core network resources for providing the wireless communication service by the wireless communication device 100 to each communication carrier.

Specifically, the frequency resource manager 300 determines the use setting of the frequency resource by the wireless communication device 100 for providing the wireless communication service by the wireless communication device 100. The use setting of the frequency resource is a setting of the frequency resource which can be used by the wireless communication device 100 for providing the wireless communication service. The wireless communication device 100 provides a wireless communication service using a part or all of the available frequency resources.

On the other hand, the core network resource manager 400 determines a use setting of a core network resource by a logical network (in other words, a slice) deployed on the core network 200 to which the wireless communication device 100 is connected for providing the wireless communication service by the wireless communication device 100. The use setting of the core network resource is a setting of the core network resource which can be used by the slice in order to provide the wireless communication service by the wireless communication device 100. The slice associated with (in other words, connected to) the wireless communication device 100 uses some or all of the available core network resources to support the provision of the wireless communication service by the wireless communication device 100.

The frequency resource manager 300 and the core network resource manager 400 can determine the use setting of another resource on the basis of the determination result of one of the frequency resource and the core network resource. Specifically, first, one of the frequency resource manager 300 or the core network resource manager 400 determines one of the frequency resource and the core network resource, and requests the other to determine the use setting of the resource that is not determined on the basis of the determination result. Then, the other requested determines the use setting of the requested resource.

The use setting of any of the frequency resource and the core network resource may be determined first. In the following, each method will be described in detail, considering the method in which the use setting of the frequency resource is determined first as a first method and the method in which the use setting of the core network resource is determined first as a second method.

<3.2.1. First Method>

The first method is a method in which the use setting of the frequency resource is determined first, and then the use setting of the core network resource is determined.

(1) Frequency Resource Use Setting Procedure

The frequency resource manager 300 determines the use setting of the frequency resource by the wireless communication device 100 for providing the wireless communication service by the wireless communication device 100. An example of the flow of this determination processing will be described below with reference to FIG. 6.

Figure 6:
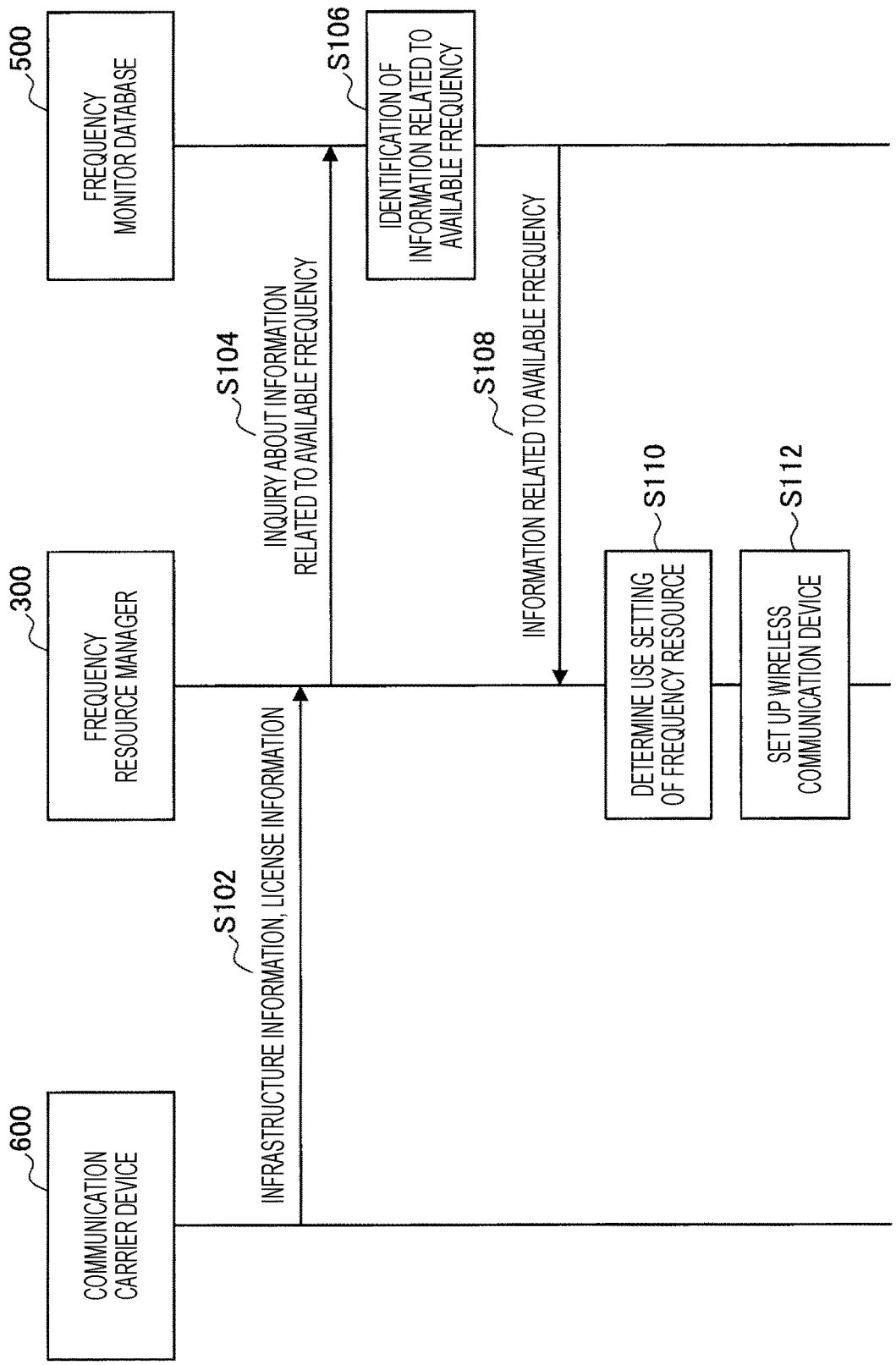
FIG. 6 is a diagram showing an example of a flow of determination processing of a use setting of a frequency resource in a first method performed in the system according to the same embodiment.

FIG. 6 is a diagram showing an example of a flow of determination processing of the use setting of the frequency resource in the first method performed in the system 1 according to the present embodiment. As shown in FIG. 6, the frequency resource manager 300, the frequency monitor database 500, and the communication carrier device 600 are involved in this sequence.

First, the communication carrier device 600 transmits infrastructure information and license information to the frequency resource manager 300 (step S102). Next, the frequency resource manager 300 inquires the frequency monitor database 500 for information related to the available frequency (step S104). Next, the frequency resource manager 300 identifies information regarding the available frequency on the basis of the inquiry from the frequency resource manager 300 (step S106). Next, the frequency resource manager 300 transmits information related to the identified available frequency to the frequency resource manager 300 (step S108). Next, the frequency resource manager 300 determines the use setting of the frequency resource on the basis of the information related to the available frequency (step S110). Then, the frequency resource manager 300 sets up the wireless communication device 100 on the basis of the determined use setting of the frequency resource (step S112).

An example of the flow of determination processing of the use setting of the frequency resource has been described above. The details will be described below.

(1.1) Infrastructure Information

When securing the infrastructure (in other words, the wireless communication device 100), the communication carrier device 600 transmits infrastructure information, which is information associated with the secured infrastructure, to the frequency resource manager 300. An example of the information included in the infrastructure information will be described below.

The infrastructure information may include installation position information which is information indicating the installation position of the wireless communication device 100. For example, the installation position information may include latitude, longitude, altitude, accuracy, indoor/outdoor identifiers or the like.

The infrastructure information may include type authentication information which is authentication information associated with the wireless communication device 100. For example, the type authentication information may include information such as the federal communications commission (FCC) identification (ID), or the technical standard compliance certification.

The infrastructure information may include device specific information which is information specific to the wireless communication device 100. For example, the device specific information may include a serial number, manufacturer information, or the like.

The infrastructure information may include wireless interface information which is information associated with a wireless interface mounted on the wireless communication device 100. For example, the wireless interface information may include a wireless access technology name, a version of a corresponding standard, or the like.

The infrastructure information may include corresponding frequency information which is information indicating a frequency to which the wireless communication device 100 corresponds (in other words, usable by the wireless communication device). For example, the corresponding frequency information may be a combination of center frequency and bandwidth. Furthermore, the corresponding frequency information may be a combination of the lower limit frequency and the upper limit frequency. Furthermore, the corresponding frequency information may be a band number or a channel number. Besides, the corresponding frequency information may take any form as long as the information indicates the frequency to which the wireless communication device 100 corresponds.

The infrastructure information may include transmission spectrum mask information which is information associated with the spectrum transmitted by the wireless communication device 100. For example, the transmission spectrum mask information may include the maximum equivalent isotropic radiated power (EIRP), an adjacent channel leakage ratio (ACLR), or the like.

The infrastructure information may include antenna information which is information associated with an antenna mounted on the wireless communication device 100. For example, antenna information may include antenna gain, tilt angle, beam width, antenna type, directivity pattern, or the like.

The infrastructure information may include installer information which is information associated with an installer of the wireless communication device 100. For example, the installer information may include the installer's name, contact information, a unique ID, or the like.

The infrastructure information may include operator information which is information associated with an operator of the wireless communication device 100. For example, the operator information may include the operator's name, contact information, a unique ID, a call sign, or the like.

An example of the information included in the infrastructure information has been described above. Note that the infrastructure information may include, in addition to the information described above, information specified in laws and regulations of each country, and information defined in the wireless interface technical regulations.

(1.2) License Information

In a case where the communication carrier has a frequency license, the communication carrier device 600 transmits, to the frequency resource manager 300, license information that is information associated with the frequency license that the communication carrier has. The frequency license may be a time-limited secondary license such as priority access license (PAL).

(1.3) Inquiry of Information Related to Available Frequency

The frequency resource manager 300 inquires the frequency monitor database 500 for information related to the available frequency. Here, the frequency resource manager 300 makes an inquiry by transmitting the infrastructure information and license information acquired from the communication carrier device 600 to the frequency monitor database 500.

(1.4) Identification of Information Related to Available Frequency

The frequency monitor database 500 identifies information related to the available frequency on the basis of an inquiry from the frequency resource manager 300. The information related to the available frequency is information indicating the frequency resources that can be used by the wireless communication device 100. For example, the frequency monitor database 500 is available with the frequency license owned by the communications carrier, and identifies the available frequency at the installation position of the infrastructure.

(1.5) Information Related to Available Frequency

The frequency monitor database 500 transmits information related to the available frequency to the frequency resource manager 300. Then, the frequency resource manager 300 acquires information related to the available frequency from the frequency monitor database 500. The information related to the available frequency may include various pieces of information. An example of the information included in the information related to the available frequency will be described below.

The information related to the available frequency includes information indicating the available frequency. For example, the available frequency may be specified as a combination of center frequency and bandwidth. Furthermore, the available frequency may be specified as a combination of the lower limit frequency and the upper limit frequency. Furthermore, the available frequency may be specified as a band number or a channel number.

The information related to the available frequency may include an identifier indicating an allowable frequency use form. Examples of allowable frequency use form include a use that requires a frequency license (licensed use) and a use that does not require a frequency license (license-exempt).

The information related to the available frequency may include information indicating legal regulations applied when using the frequency. For example, the information indicating applicable laws and regulations may include FCC rule numbers (for example, 47 C. F. R Part 96, and 47 C. F. R Part 15, or the like). Furthermore, the information indicating applicable laws and regulations may include ETSI European Norm, Harmonized Standard numbers, or the like. Besides, the information indicating the applicable laws and regulations may include any information indicating the laws and regulations applied when using the frequency.

The information related to the available frequency may include information indicating transmission power that is allowed when using the frequency. For example, the information indicating the allowed transmission power may include information indicating the maximum allowable transmission power at the available frequency, and the maximum allowable EIRP.

The information related to the available frequency may include information indicating an antenna setting that is allowed when using the frequency. For example, the information indicating the allowable antenna setting may include information indicating the installation height, the maximum allowable beam width, the tilt angle allowable range, the allowable antenna orientation, or the like.

The information related to the available frequency may include information indicating the expiration date of the information related to the available frequency.

(1.6) Determination of Frequency Resource Use Setting

The frequency resource manager 300 determines the use setting of the frequency resource by the wireless communication device 100 for providing the wireless communication service by the wireless communication device 100. Specifically, the frequency resource manager 300 selects a wireless parameter to be used in each of the one or more wireless communication devices 100 on the basis of the information related to the available frequency. At that time, it is desirable that radio parameters be selected in consideration of interference to another wireless communication device 100 related to the wireless communication device 100 for which the wireless parameter is to be determined and interference from the another wireless communication device 100, in other words, in consideration of network coexistence. Note that the selection of the wireless parameter may be performed by the communication carrier device 600 or in cooperation with the communication carrier device 600.

The radio parameter to be selected may be variously considered. For example, the selected wireless parameter may include frequency, transmission power, EIRP, installation position, antenna setting, and wireless interface information.

The frequency resource manager 300 selects the radio parameter allowed by the frequency monitor database 500. For that purpose, the frequency resource manager 300 notifies the frequency monitor database 500 of the selected radio parameter. Then, the frequency monitor database 500 determines whether or not the wireless parameter is allowable, and notifies the frequency resource manager 300 of the determination result. The frequency resource manager 300 may reselect the radio parameters until allowed.

(1.7) Setup of Wireless Communication Device 100

The frequency resource manager 300 sets up the wireless communication device 100 using the wireless parameter allowed by the frequency monitor database 500. In other words, the frequency resource manager 300 performs setting for causing the wireless communication device 100 to use the selected parameter. The frequency resource manager 300 may set up the wireless communication device 100 directly or indirectly via the infrastructure manager 800.

When setup of the wireless communication device 100 is completed, the wireless communication device 100 can generally start to emit radio waves. However, even though the wireless communication device 100 is physically connected to the core network 200, it is logically not connected. That is, since the wireless communication device 100 is not associated with the slice (in other words, not connected), provision of wireless communication service is still impossible.

Therefore, as described below, the use setting of the core network resource and the setup of the core network 200 are performed.

(2) Use Setting Procedure of Core Network Resource

The core network resource manager 400 determines the use setting of the core network resource for providing the wireless communication service by the wireless communication device 100. An example of the flow of this determination processing will be described below with reference to FIG. 7.

Figure 7:
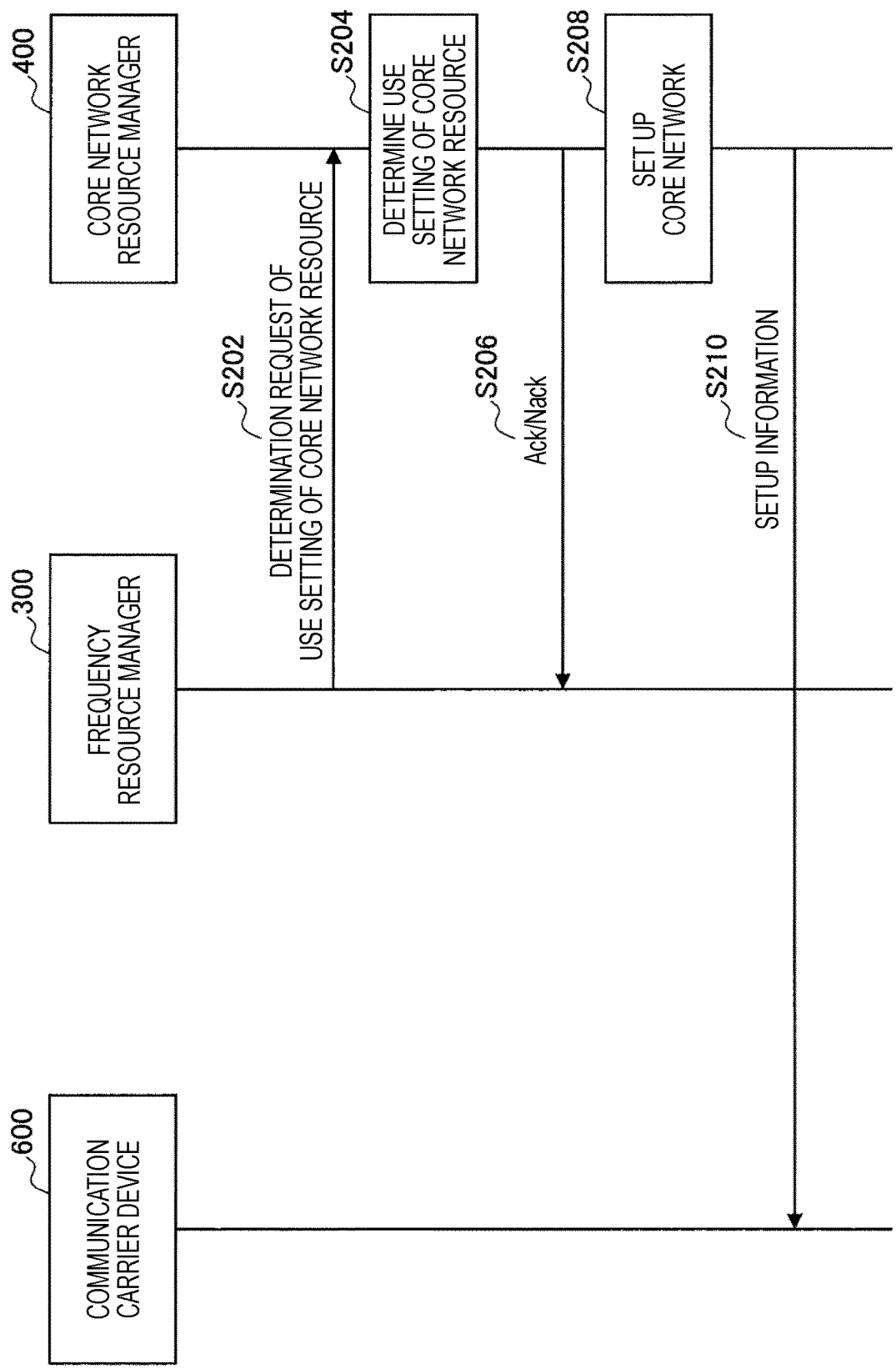
FIG. 7 is a diagram showing an example of a flow of resource securing processing in the first method performed in the system according to the same embodiment.

FIG. 7 is a diagram showing an example of a flow of determination processing of a use setting of a core network resource in the first method performed in the system 1 according to the present embodiment. The frequency resource manager 300, the core network resource manager 400, and the communication carrier device 600 are involved in this sequence.

First, the frequency resource manager 300 transmits, to the core network resource manager 400, a request for determining the use setting of the core network resource (step S202). Next, the core network resource manager 400 determines the use setting of the core network resources (step S204). Next, the core network resource manager 400 transmits information indicating whether or not the determination of the use setting of the core network resource is completed (Ack/Nack) to the frequency resource manager 300 (step S206). Next, the core network resource manager 400 sets up the core network 200 on the basis of the determined use setting of the core network resources (step S208). Then, the core network resource manager 400 transmits setup information to the communication carrier device 600 (step S210).

An example of the flow of determination processing of the use setting of the core network resource has been described above. The details will be described below.

(2.1) Request for Determination of Use Setting of Core Network Resource

After determining the use setting of the frequency resource, the frequency resource manager 300 requests the core network resource manager 400 to determine the use setting of the core network resource.

Specifically, the frequency resource manager 300 requests the core network resource determination by transmitting, to the core network resource manager 400, use setting information of the frequency resource indicating the determined use setting of the frequency resource. At this time, the frequency resource manager 300 transmits the use setting information of the frequency resource with the service information indicating the wireless communication service provided by the wireless communication device 100 in association with each other. The core network resource manager 400 can determine an appropriate use setting of the core network resource by providing the use setting information of the frequency resource and the service information in association with each other. Specifically, the core network resource manager 400 can determine an amount of resources that is balanced with the frequency resources used by the wireless communication device 100 and is appropriate for the provided wireless communication service.

For example, the use setting information of the frequency resource may include the information related to the available frequency acquired from the frequency monitor database 500 and the information indicating the selected radio parameter.

For example, the service information may include operator name, service type, and service deployment area information. Note that the operator name may be the ID of the operator. Furthermore, examples of the service type include high speed communication, low speed communication, low delay communication, and public safety. Furthermore, the service deployment area information may include the ID of the infrastructure (in other words, the wireless communication device 100) that is desired to use for the deployment of the service, and geographic region information such as a set of location coordinates or administrative division information.

(2.2) Determination of Use Setting of Core Network Resource

The core network resource manager 400 acquires information (for example, use setting information of the frequency resources) transmitted from the frequency resource manager 300. Then, the core network resource manager 400 determines the use setting of the core network resource by the slice for providing the wireless communication service by the wireless communication device 100 on the basis of the acquired information. In other words, the core network resource manager 400 provides the slice to the wireless communication device 100 and the communication carrier at this timing.

Typically, the core network resource manager 400 determines the amount of core network resources (for example, the amount of computer resources) available for use for providing the wireless communication service by the wireless communication device 100. The criteria for determining the amount of core network resources can be considered in various ways. An example will be described below.

For example, the core network resource manager 400 may determine the amount of core network resources on the basis of an estimate value of the number of terminals that the wireless communication device 100 can accommodate. In this case, the core network resource manager 400 estimates the number of terminals accommodated in wireless communication device 100 on the basis of the wireless parameters, and provides a slice of the minimum required size for service provision to the estimated number of user terminals. Specifically, the core network resource manager 400 first calculates the coverage size and the number of cells from the frequency, the transmission power, and the antenna setting. Next, the core network resource manager 400 calculates the number of terminals that can be accommodated from the frequency width used by the cell and the frequency resource amount per a terminal required by the service content that the communication carrier desires to provide (massive IoT, narrow-band IoT, enhanced mobile broadband (eMBB), or the like). Then, the core network resource manager 400 determines the amount of resources to be allocated to the slice to which the wireless communication device 100 is connected on the basis of the calculated number of terminals that can be accommodated.

For example, in a case where the wireless communication device 100 uses a plurality of frequencies, the core network resource manager 400 may provide, for each frequency, a slice of the minimum required size for providing the wireless communication service. In other words, a slice may be associated with each frequency used by the wireless communication device 100. Then, the core network resource manager 400 may determine the use setting of the core network resource by the slice associated with each of the plurality of frequencies used by the wireless communication device 100.

For example, in a case where carrier aggregation is used and a plurality of frequencies is bundled and used, the core network resource manager 400 may provide one slice for the plurality of frequencies bundled and used. In other words, a plurality of frequencies used by the wireless communication device 100 may be associated with one slice. Then, the core network resource manager 400 may determine the use setting of the core network resource by one slice associated with the plurality of frequencies used by the wireless communication device 100.

Note that determination of the use setting of the core network resource may include determination of various settings other than setting of resource amount. For example, the core network resource manager 400 may determine, as one of use settings, a physical machine on which a virtual machine providing a slice operates. For example, the core network resource manager 400 can reduce the delay by operating a virtual machine that provides a slice for the wireless communication device 100 in a physical machine near the wireless communication device 100.

(2.3) Setup of Core Network

After determining the use setting of core network resource, the core network resource manager 400 sets up the core network 200 for the communication carrier according to the determination result. At this time, the core network resource manager 400 also performs setup of the core network 200 and the wireless communication device 100. Specifically, the core network resource manager 400 performs allocation and switching of calculation resources according to the determined use setting to control the resources of the slice, and associates (in other words, logically connects) the slice with the wireless communication device 100.

(2.4) Setup Information

After completing the setup of the core network 200, the core network resource manager 400 generates setup information and transmits the setup information to the communication carrier device 600.

The setup information is information that associates the wireless communication device 100, the determined use setting of the frequency resource, and the determined use setting of the core network resource. More simply, the setup information is information that associates the wireless communication device 100, the frequency resource, and the slice. The setup information is generated and the communication carrier device 600 is notified so that the communication carrier can cause the wireless communication device 100 to provide a wireless communication service using frequency resources and core network resources. An example of the information included in the setup information will be described below.

The setup information may include the ID of the wireless communication device 100 associated with the slice.

The setup information may include use setting information of the core network resource. For example, the use setting information of the core network resource may include the ID of the slice connected to the wireless communication device 100, the resource size available to the slice, and the recommended use.

The setup information may include the use setting information of the frequency resource. For example, the use setting information of the frequency resource may include the frequency used by the wireless communication device 100, transmission power, EIRP, installation position, antenna setting, and wireless interface information.

By the processing described above, when the setup of the wireless communication device 100 and the core network 200 is completed, the wireless communication device 100 can start emitting a radio wave and start providing a wireless communication service.

<3.2.2. Second Method>

The second method is a method in which the use setting of the core network resource is determined first, and then the use setting of the frequency resource is determined.

(1) Use Setting Procedure of Core Network Resource

The core network resource manager 400 determines the use setting of the core network resource for providing the wireless communication service by the wireless communication device 100. An example of the flow of this determination processing will be described below with reference to FIG. 8.

Figure 8:
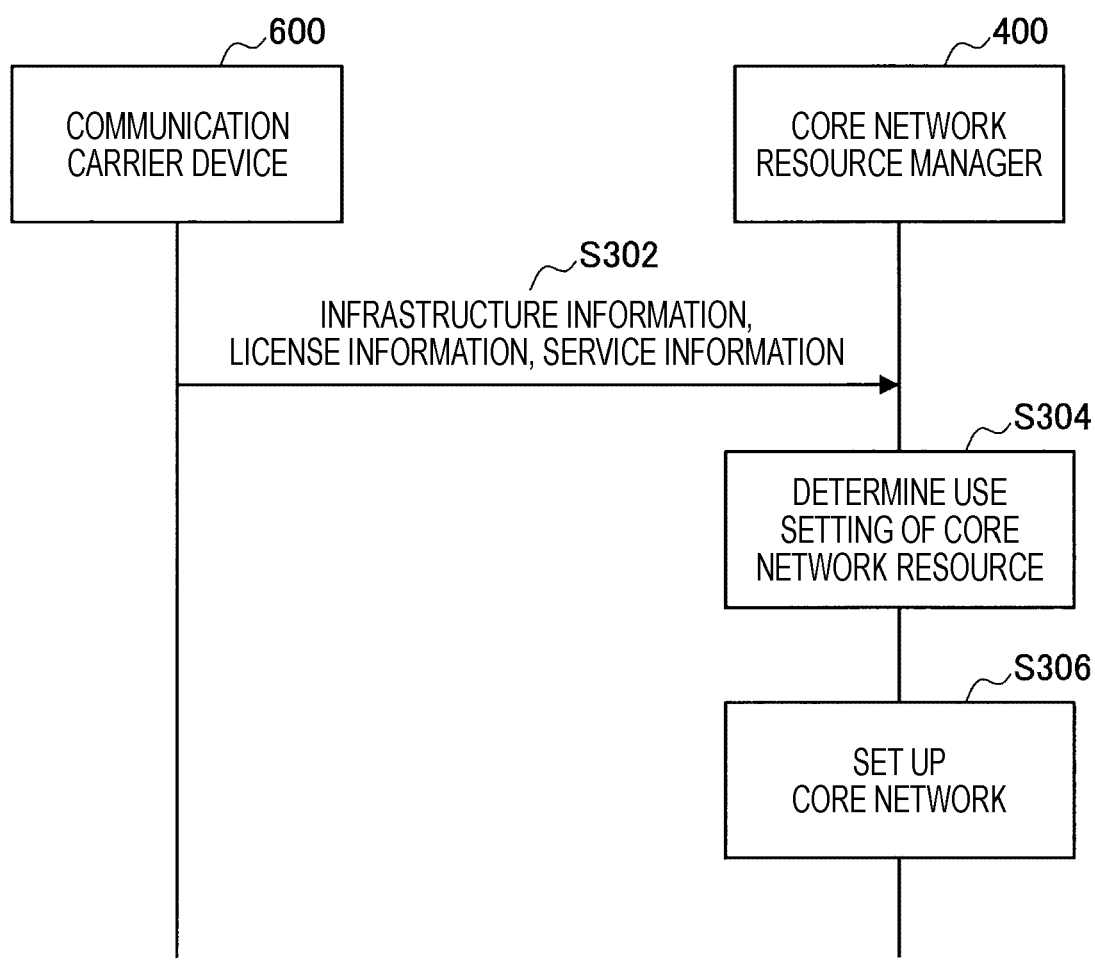
FIG. 8 is a diagram showing an example of a flow of determination processing of a use setting of a core network resource in a second method performed in the system according to the same embodiment.

FIG. 8 is a diagram showing an example of a flow of determination processing of the use setting of the core network resource in the second method performed in the system 1 according to the present embodiment. As shown in FIG. 8, the core network resource manager 400 and the communication carrier device 600 are involved in this sequence.

First, the communication carrier device 600 transmits infrastructure information, license information and service information to the core network resource manager 400 (step S302). Next, the core network resource manager 400 determines the use setting of the core network resource (step S304). Next, the core network resource manager 400 sets up the core network 200 on the basis of the determined use setting of the core network resource (step S306).

An example of the flow of determination processing of the use setting of the core network resource has been described above. The details will be described below.

(1.1) Infrastructure Information

When securing the infrastructure (in other words, the wireless communication device 100), the communication carrier device 600 transmits infrastructure information, which is information associated with the secured infrastructure, to the core network resource manager 400. The infrastructure information is as described above, and thus the description thereof will not be repeated.

(1.2) License Information

In a case where the communication carrier has a frequency license, the communication carrier device 600 transmits, to the core network resource manager 400, license information that is information associated with the frequency license that the communication carrier has. The license information is as described above, and thus the description thereof will not be repeated.

(1.3) Service Information

The communication carrier device 600 transmits, to the core network resource manager 400, service information that the communication carrier desires to provide, in other words, the information associated with the wireless communication service provided by the wireless communication device 100. The information included in the service information is as described above, and thus the description thereof will not be repeated.

(1.4) Determination of Use Setting of Core Network Resource

The core network resource manager 400 determines the use setting of the core network resource by the slice for providing the wireless communication service by the wireless communication device 100. Specifically, the core network resource manager 400 determines the use setting of the core network resource by the slice connected to the wireless communication device 100 on the basis of the infrastructure information, the license information, and the information regarding the wireless communication service. In other words, the core network resource manager 400 provides the slice to the wireless communication device 100 and the communication carrier at this timing.

Typically, the core network resource manager 400 determines the amount of core network resources (for example, the amount of computer resources) available for use for providing the wireless communication service by the wireless communication device 100. The criteria for determining the amount of core network resources can be considered in various ways. An example will be described below.

For example, the core network resource manager 400 may determine the amount of core network resources on the basis of an estimate value of the number of terminals that the wireless communication device 100 can accommodate. In this case, the core network resource manager 400 estimates the number of terminals that can be accommodated by the wireless communication device 100 on the basis of the provided wireless communication service and the capabilities of the wireless communication device 100 to be used, and provides a network slice of the size required for service provision to the estimated number of terminals. Specifically, the core network resource manager 400 first calculates the coverage size and the number of cells that can be provided from the capabilities of the wireless communication device 100. Next, the core network resource manager 400 calculates the number of terminals that can be accommodated by the wireless communication device 100 from the frequency resource amount required by the terminals in the wireless communication service that the communication carrier desires to provide, and the calculated coverage size and number of cells. Then, the core network resource manager 400 determines the amount of resources to be allocated to the slice to which the wireless communication device 100 is connected on the basis of the calculated number of terminals that can be accommodated.

For example, in a case where a plurality of wireless communication devices 100 simultaneously provides a wireless communication services to one user terminal, the core network resource manager 400 may determine that the plurality of wireless communication devices 100 accommodates one slice. In other words, a plurality of wireless communication devices 100 may be associated with one slice. Then, the core network resource manager 400 may determine the use setting of the core network resource by one slice associated with a plurality of wireless communication devices 100. Note that dual connectivity and coordinated multi-point (CoMP) are examples of the case where a plurality of wireless communication devices 100 simultaneously provides wireless communication services to one user terminal.

(1.5) Core Network Setup

After determining the use setting of core network resource, the core network resource manager 400 sets up the core network 200 for the communication carrier according to the determination result. At this time, the core network resource manager 400 also performs setup of the core network 200 and the wireless communication device 100. Specifically, the core network resource manager 400 performs allocation and switching of calculation resources according to the determined use setting to control the resources of the slice, and associates (in other words, logically connects) the slice with the wireless communication device 100.

(2) Frequency Resource Use Setting Procedure

The frequency resource manager 300 determines the use setting of the frequency resource by the wireless communication device 100 for providing the wireless communication service by the wireless communication device 100. An example of the flow of this determination processing will be described below with reference to FIG. 9.

Figure 9:
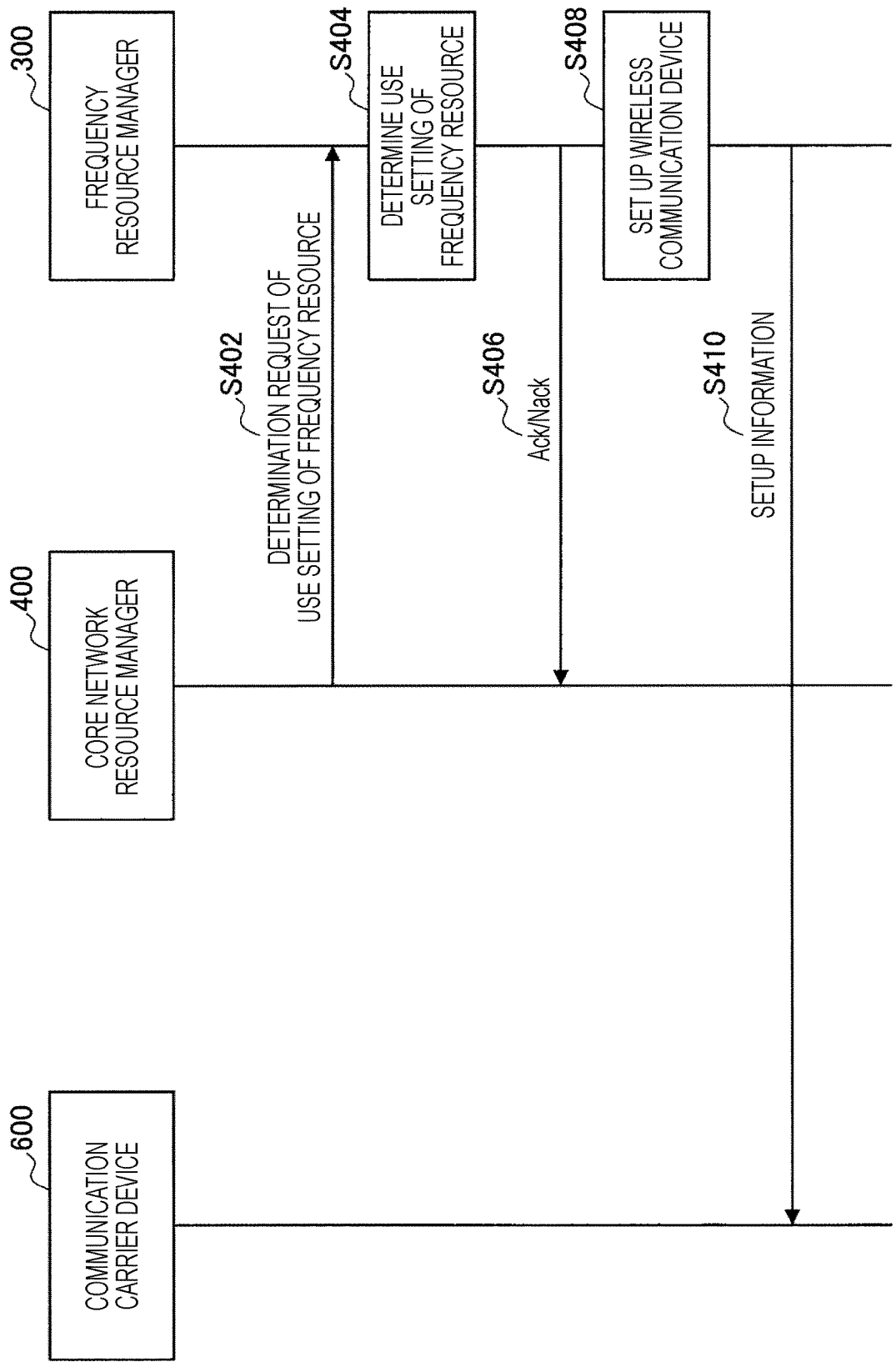
FIG. 9 is a diagram showing an example of a flow of determination processing of a use setting of a frequency resource in a second method performed in the system according to the same embodiment.

FIG. 9 is a diagram showing an example of a flow of determination processing of the use setting of the frequency resource in the second method performed in the system 1 according to the present embodiment. As shown in FIG. 9, the frequency resource manager 300, the core network resource manager 400, and the communication carrier device 600 are involved in this sequence.

First, the core network resource manager 400 transmits, to the frequency resource manager 300, a request for determining the use setting of the frequency resource (step S402). Next, the frequency resource manager 300 determines the use setting of the frequency resource (step S404). Next, the frequency resource manager 300 transmits information indicating whether or not the determination of the use setting of the frequency resource is completed (Ack/Nack) to the core network resource manager 400 (step S406). Next, the frequency resource manager 300 sets up the wireless communication device 100 on the basis of the determined use setting of the frequency resource (step S408). Then, the frequency resource manager 300 transmits setup information to the communication carrier device 600 (step S410).

An example of the flow of determination processing of the use setting of the frequency resource has been described above. The details will be described below.

(2.1) Determination Request of Frequency Resource Use Setting

After determining the use setting of the core network resource, the core network resource manager 400 requests the frequency resource manager 300 to determine the use setting of the frequency resource.

Specifically, the core network resource manager 400 requests the determination of the frequency resource by transmitting, to the frequency resource manager 300, the use setting information of the core network resource indicating the determined use setting of the core network resource. At this time, the core network resource manager 400 transmits the use setting information of the core network resource with the information indicating the wireless communication device 100 in association with each other. The frequency resource manager 300 can determine an appropriate use setting of the frequency resource by providing the use setting information of the core network resource and the information indicating the wireless communication device 100 in association with each other. Specifically, the frequency resource manager 300 can determine an amount of resources that is balanced with the core network resources used by the slice connected to the wireless communication device 100, and is appropriate for the wireless communication service provided by the wireless communication device 100.

For example, the use setting information of the core network resource may include the ID of the slice, the resource size available to the slice, and the recommended use.

For example, the information indicating the wireless communication device 100 may include the ID of the wireless communication device 100 and information indicating the installation position.

Moreover, the core network resource manager 400 may transmit information indicating the recommended frequency resource use setting to the frequency resource manager 300 when requesting the determination of the frequency resource. For example, the information indicating the use setting of the recommended frequency resource is included in the information indicating the wireless communication device 100 to be transmitted in association with the use setting information of the core network resource. This enables the frequency resource manager 300 to determine the use setting of the frequency resource with reference to the recommended use setting. The information indicating the use setting of the recommended frequency resource may include, for example, information indicating a recommended frequency bandwidth, a recommended frequency, and a recommended transmission power.

(2.2) Determination of Frequency Resource Use Setting

The frequency resource manager 300 acquires information (for example, use setting information of the core network resource) transmitted by the core network resource manager 400. Then, the frequency resource manager 300 determines the use setting of the frequency resource by the wireless communication device 100 for providing the wireless communication service by the wireless communication device 100 on the basis of the acquired information.

Typically, the frequency resource manager 300 determines the amount of frequency resources (for example, the frequency bandwidth) available for use for providing the wireless communication service by the wireless communication device 100. Of course, the frequency resource manager 300 may also determine other radio parameters such as frequency and transmission power.

A method similar to the first method is adopted as the method for determining the use setting of frequency resource. Specifically, the frequency resource manager 300 acquires infrastructure information and license information from the communication carrier device 600 or the core network resource manager 400. Next, the frequency resource manager 300 makes an inquiry to the frequency monitor database 500 to acquire information related to available frequency. Then, the frequency resource manager 300 selects a wireless parameter to be used in each of the one or more wireless communication devices 100 on the basis of the information related to the available frequency.

In particular, in the second method, the frequency resource manager 300 determines the use setting of the frequency resource on the basis of the information acquired from the core network resource manager 400 in addition to the information related to the available frequency. For example, the frequency resource manager 300 may calculate an estimated value of the number of terminals that can be accommodated by the slice on the basis of the use setting of the core network resource, and determine the amount of frequency resources on the basis of the estimated value. Specifically, first, the frequency resource manager 300 estimates the number of terminals that can be accommodated by the slice on the basis of the wireless communication service that the communication carrier desires to provide and the amount of core network resources used by the slice associated with the wireless communication device 100. Subsequently, the frequency resource manager 300 determines the frequency resource of the minimum required size to provide the size required to provide the service for the estimated number of terminals.

(2.3) Setup of Wireless Communication Device 100

The frequency resource manager 300 sets up the wireless communication device 100 using the selected wireless parameter. The setup of the wireless communication device 100 is as described above in the first method.

(2.4) Setup Information

After completing the setup of the frequency resource, the frequency resource manager 300 generates setup information and transmits the setup information to the communication carrier device 600. The setup information is as described above in the first method.

By the processing described above, when the setup of the wireless communication device 100 and the core network 200 is completed, the wireless communication device 100 can start emitting a radio wave and start providing a wireless communication service.

<3.3. Update of Use Setting>

One of the frequency resource manager 300 or the core network resource manager 400 determines the change of one of the use setting of the frequency resource or the use setting of the core network resource in a case where a predetermined condition is satisfied, and requests the other to determine the change of the use setting of the resource that is not determined.

In a Case where a Change of the Use Setting of the Frequency Resource is the Starting Point For example, in a case where the predetermined condition is satisfied, the frequency resource manager 300 determines again the use setting of the frequency resource for providing the wireless communication service by the wireless communication device 100. Then, the frequency resource manager 300 transmits, to the core network resource manager 400, a request for determining the use setting of the core network resource on the basis of the determination result again. As a result, the core network resource manager 400 determines again the use setting of the core network resource for providing the wireless communication service by the wireless communication device 100. The specific processing is similar to the first method described above.

The predetermined condition includes, for example, that the frequency resource used so far has become unavailable for use by the primary system. Furthermore, the predetermined condition includes, for example, that there is a request from another communication carrier. Even in a case where such a change in situation occurs, the system 1 can again determine the appropriate amount of frequency resources and core network resources that are balanced with each other.

In a Case where a Change of the Use Setting of the Core Network Resource is the Starting Point For example, in a case where a predetermined condition is satisfied, the core network resource manager 400 again determines the use setting of the core network resource for providing the wireless communication service by the wireless communication device 100. Then, the core network resource manager 400 transmits, to the frequency resource manager 300, a request for determining the use setting of the frequency resource on the basis of the determination result again. As a result, the frequency resource manager 300 determines again the use setting of the frequency resource for providing the wireless communication service by the wireless communication device 100. The specific processing is similar to the second method described above.

The predetermined condition includes, for example, that the core network 200 has undergone maintenance. Furthermore, the predetermined condition includes, for example, that there is a request from another communication carrier.

Even in a case where such a change in situation occurs, the system 1 can again determine the appropriate amount of frequency resources and core network resources that are balanced with each other.

4. APPLICATION EXAMPLE

The technology according to the present disclosure can be applied to various products. For example, the frequency resource manager 300 and the frequency resource manager 300 may be realized as any type of server, such as a tower server, a rack server, or a blade server. Furthermore, the frequency resource manager 300 and the core network resource manager 400 may be control modules mounted on a server (for example, an integrated circuit module configured with one die, or a card or blade inserted in a slot of a blade server).

Figure 10:
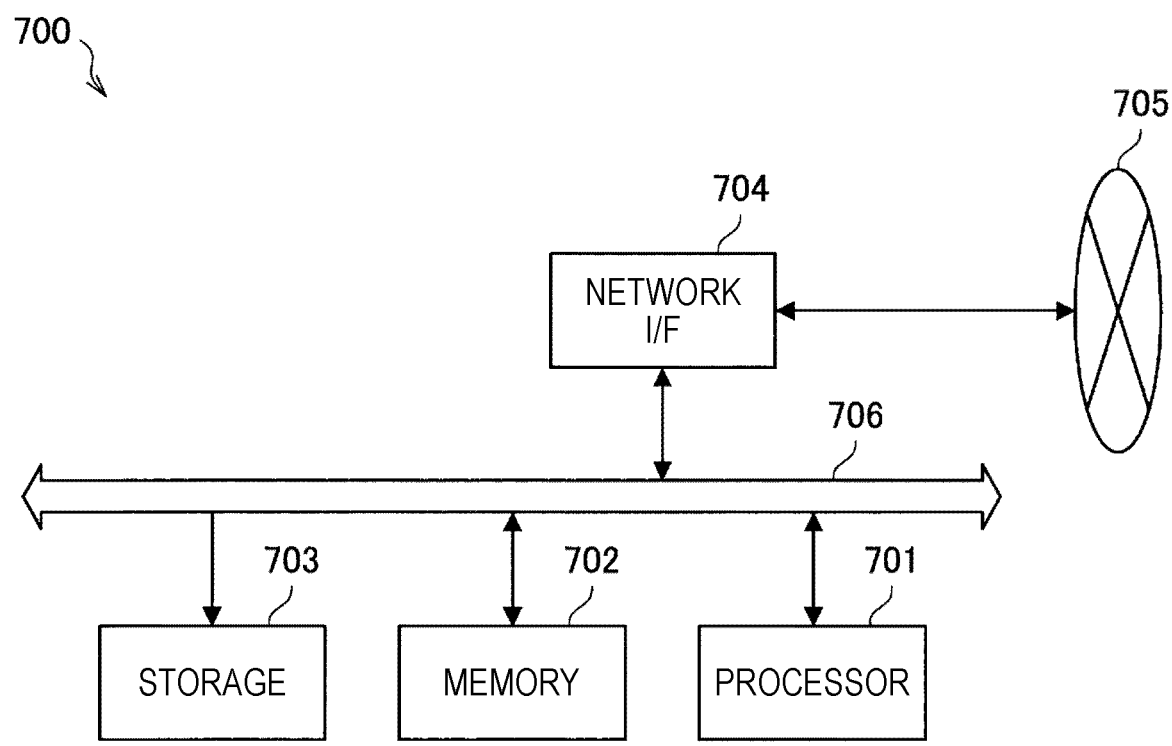
FIG. 10 is a block diagram showing an example of a schematic configuration of a server.

FIG. 10 is a block diagram showing an example of a schematic configuration of the server 700 to which the technology according to the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls various functions of the server 700. The memory 702 includes a random access memory (RAM) and a read only memory (ROM), and stores programs and data to be executed by the processor 701. The storage 703 may include a storage medium such as a semiconductor memory or a hard disk.

The network interface 704 is a wired communication interface for connecting the server 700 to the wired communication network 705. The wired communication network 705 may be a core network such as evolved packet core (EPC), or may be a packet data network (PDN) such as the Internet.

The bus 706 connects the processor 701, the memory 702, the storage 703, and the network interface 704 to one another. The bus 706 may include two or more buses of different speeds (for example, a high speed bus and a low speed bus).

In the server 700 shown in FIG. 10, one or more components (the acquisition unit 331, the determination unit 333, and/or the request unit 335) included in the frequency resource manager 300 described above with reference to FIG. 4, or one or more components (the acquisition unit 431, the determination unit 433 and/or the request unit 435) included in the core network resource manager 400 described above with reference to FIG. 5 may be implemented in the processor 701. As an example, a program for causing the processor to function as the one or more components (in other words, a program for causing the processor to execute the operation of the one or more components) may be installed in the server 700, and the processor 701 may execute the program. As another example, the server 700 may include a module including the processor 701 and the memory 702, and one or more components may be implemented in the module. In this case, the module may store a program for causing the processor to function as the one or more components in the memory 702, and execute the program by the processor 701. As described above, the server 700 or the module may be provided as a device including the one or more components, and a program for causing the processor to function as the one or more components may be provided. Furthermore, the readable recording medium in which the program described above is recorded may be provided.

Furthermore, in the server 700 shown in FIG. 10, for example, the network communication unit 310 described with reference to FIG. 4 or the network communication unit 410 described next with reference to FIG. 5 may be implemented in the network interface 704. Furthermore, the storage unit 320 or the storage unit 420 may be implemented in the memory 702 and/or the storage 703.

5. CONCLUSION

An embodiment of the present disclosure has been described above in detail with reference to FIGS. 1 to 10. As described above, one of the frequency resource manager 300 or the core network resource manager 400 according to the present embodiment determines one of the use setting of the frequency resource by the wireless communication device 100, and the use setting of the network resource by the logical network deployed on the physical network to which the wireless communication device 100 is connected, for providing the wireless communication service by the wireless communication device 100. Then, one of the frequency resource manager 300 or the core network resource manager 400 that has made determination above requests the other to determine the use setting of resources of which the determination is not made on the basis of the determination result. Then, the other requested determines the use setting of the resource that has not been determined on the basis of the request. As a result, the use setting of the frequency resource or the core network resource is determined on the basis of the determination result of the other use setting, and the use setting can be determined so that the frequency resource and the core network resource are balanced with each other. Accordingly, unnecessary allocation of resources is reduced, and too little allocation is prevented, and resource utilization efficiency can be improved.

While preferred embodiments of the present disclosure have been described above in detail with reference to the accompanying drawings, the technical scope of the present disclosure is not limited to such examples. It is obvious that various variations and modifications can be conceived within the scope of the technical idea described in the claims by a person having ordinary knowledge in the field of technology to which the present disclosure belongs, and, of course, it is understood that these variations and modifications belong to the technical scope of present disclosure.

Furthermore, the processing described using the flowchart and the sequence diagram in the present specification may not necessarily be performed in the illustrated order. Some processing steps may be performed in parallel. Furthermore, additional processing steps may be employed and some processing steps may be omitted.

Furthermore, the effects described in the present specification are merely illustrative or exemplary, and are not limitative. That is, the technique according to the present disclosure can exhibit other effects obvious to those skilled in the art from the description of the present specification together with the effects described above or instead of the effects described above.

Note that the following configuration is also within the technical scope of the present disclosure.

(1)

A device including:

a determination unit that determines one of a use setting of a frequency resource by a wireless communication device, and a use setting of a network resource by a logical network deployed on a physical network to which the wireless communication device connects, for providing a wireless communication service by the wireless communication device; and a request unit that requests another device to determine a use setting of a resource that is not determined on the basis of a determination result by the determination unit.

(2)

The device according to (1) described above, in which the determination unit determines the use setting of the frequency resource, and the request unit transmits information indicating the use setting of the frequency resource determined to the another device.

(3)

The device according to (2) described above, in which the request unit transmits the information indicating the use setting of the frequency resource determined and information indicating the wireless communication service provided in association with each other to the another device.

(4)

The device according to (2) or (3) described above, in which the determination unit acquires information indicating the frequency resource that can be used by the wireless communication device from a frequency monitor database.

(5)

The device according to (1) described above, in which the determination unit determines the use setting of the network resource, and the request unit transmits information indicating the use setting of the network resource determined to the another device.

(6)

The device according to (5) described above, in which the request unit transmits the information indicating the use setting of the network resource determined and the information indicating the wireless communication device in association with each other to the another device.

(7)

The device according to (6) described above, in which the request unit transmits, to the another device, information indicating the use setting of the frequency resource recommended.

(8)

The device according to any of (1) to (7) described above, in which the determination unit determines, in a case where a predetermined condition is satisfied, a change of one of the use setting of the frequency resource and the use setting of the network resource, and the request unit requests the another device to determine the change of the use setting of the resource of which change is not determined.

(9) A device including:

an acquisition unit that acquires information indicating a determination result of one of a use setting of a frequency resource by a wireless communication device, and a use setting of a network resource by a logical network deployed on a physical network to which the wireless communication device connects, for providing a wireless communication service by the wireless communication device; and a determination unit that determines a use setting of a resource that is not determined on the basis of information acquired by the acquisition unit.

(10)

The device according to (9) described above, in which the determination unit determines an amount of resources that can be used for providing a wireless communication service by the wireless communication device.

(11)

The device according to (9) or (10) described above, in which the determination unit determines on the basis of an estimated value of a number of terminals that can be accommodated by the wireless communication device or the logical network.

(12)

The device according to any one of (9) to (11) described above, in which the logical network is associated with each frequency used by the wireless communication device.

(13)

The device according to any one of (9) to (11) described above, in which a plurality of frequencies used by the wireless communication device is associated with one of the logical networks.

(14)

The device according to any one of (9) to (11) described above, in which a plurality of the wireless communication devices is associated with one of the logical network.

(15)

The device according to any one of (9) to (14) described above, in which the determination unit generates information in which the wireless communication device, the use setting of the frequency resource determined, and the use setting of the network resource determined are associated.

(16)

A method including:

determining, by a processor, one of a use setting of a frequency resource by a wireless communication device, and a use setting of a network resource by a logical network deployed on a physical network to which the wireless communication device connects, for providing a wireless communication service by the wireless communication device; and requesting another device to determine a use setting of a resource that is not determined on the basis of a determination result.

(17)

A method including:

acquiring information indicating a determination result of one of a use setting of a frequency resource by a wireless communication device, and a use setting of a network resource by a logical network deployed on a physical network to which the wireless communication device connects, for providing a wireless communication service by the wireless communication device; and determining, by a processor, a use setting of a resource that is not determined on the basis of information acquired.

(18)

A recording medium in which a program is recorded, the program causing a computer to function as:

a determination unit that determines one of a use setting of a frequency resources by a wireless communication device, and a use setting of a network resource by a logical network deployed on a physical network to which the wireless communication device connects, for providing a wireless communication service by the wireless communication device; and a request unit that requests another device to determine a use setting of a resource that is not determined on the basis of a determination result by the determination unit.

(19)

A recording medium in which a program is recorded, the program causing a computer to function as:

an acquisition unit that acquires information indicating a determination result of one of a use setting of a frequency resource by a wireless communication device, and a use setting of a network resource by a logical network deployed on a physical network to which the wireless communication device connects, for providing a wireless communication service by the wireless communication device; and a determination unit that determines a use setting of a resource that is not determined on the basis of information acquired by the acquisition unit.

REFERENCE SIGNS LIST

1 System
100 Wireless Communication Device
200 Core Network
300 Frequency Resource Manager
310 Network Communication Unit
320 Storage Unit
330 Processing Unit
331 Acquisition Unit
333 Determination Unit
335 Request Unit
400 Core Network Resource Manager
410 Network Communication Unit
420 Storage Unit
430 Processing Unit
431 Acquisition Unit
433 Determination Unit
435 Request Unit
500 Frequency Monitor Database
600 Communication Carrier Device
800 Infrastructure Manager

The invention claimed is:

1. A first device, comprising:
at least one processor configured to:
receive infrastructure information that includes at least one of authentication information associated with a wireless communication device, wireless interface information associated with a wireless interface mounted on the wireless communication device, or antenna information associated with an antenna mounted on the wireless communication device;
determine one of a first use setting of at least one frequency resource of a plurality of frequency resources by the wireless communication device, or a second use setting of at least one network resource of a plurality of network resources by a logical network deployed on a physical network which is connected to the wireless communication device, to provide a wireless communication service by the wireless communication device,
wherein the determination of the second use setting of the at least one network resource is based on the infrastructure information;
send a request to a second device to determine one of the first use setting of the at least one frequency resource or the second use setting of the at least one network resource that is not determined by the at least one processor;
determine, in a case where a specific condition is satisfied, a change of one of the first use setting of the at least one frequency resource or the second use setting of the at least one network resource; and
request the second device to determine the change of one of the first use setting of the at least one frequency resource or the second use setting of the at least one network resource that is not determined by the at least one processor.

2. The first device according to claim 1, wherein the at least one processor is further configured to transmit first information, that indicates the determined first use setting of the at least one frequency resource, to the second device.

3. The first device according to claim 2, wherein the at least one processor is further configured to transmit second information that indicates the wireless communication service provided in association with the first information to the second device.

4. The first device according to claim 2, wherein the at least one processor is further configured to acquire third information that indicates the at least one frequency resource that can be used by the wireless communication device from a frequency monitor database.

5. The first device according to claim 1, wherein the at least one processor is further configured to transmit first information that indicates the second use setting of the determined at least one network resource to the second device.

6. The first device according to claim 5, wherein the at least one processor is further configured to transmit second information, that indicates the wireless communication service, in association with the first information to the second device.

7. The first device according to claim 6, wherein the at least one processor is further configured to transmit, to the second device, third information that indicates a recommended use setting of the at least one frequency resource.

8. The first device according to claim 1, wherein the at least one processor is further configured to inquire a frequency monitor database for information related to an available frequency based on the infrastructure information and license information acquired from a communication carrier device.

9. A first device, comprising:
at least one processor configured to:
receive infrastructure information that includes at least one of authentication information associated with a wireless communication device, wireless interface information associated with a wireless interface mounted on the wireless communication device, or antenna information associated with an antenna mounted on the wireless communication device;
acquire first information that indicates a first determination result of one of a first use setting of at least one frequency resource of a plurality of frequency resources by the wireless communication device or a second use setting of at least one network resource of a plurality of network resources by a logical network deployed on a physical network connected to the wireless communication device, to provide a wireless communication service by the wireless communication device,
wherein the first information is acquired from a second device communicatively coupled with the first device;
determine one of the first use setting of the at least one frequency resource or the second use setting of the at least one network resource that is not determined via the first determination result,
wherein the determination of the second use setting of the at least one network resource is based on the acquired first information and the infrastructure information; and
determine a change of one of the first use setting of the at least one frequency resource or the second use setting of the at least one network resource that is not determined via a second determination result received from the second device.

10. The first device according to claim 9, wherein the at least one processor is further configured to determine an amount of the at least one frequency resource of the plurality of frequency resources or the at least one network resource of the plurality of network resources that is used to provide the wireless communication service by the wireless communication device.

11. The first device according to claim 9, wherein the at least one processor is further configured to determine an estimated value of a number of terminals that is accommodated by one of the wireless communication device or the logical network.

12. The first device according to claim 11, wherein the at least one processor is further configured to determine the first use setting of the at least one frequency resource based on the determined estimated value of the number of terminals that is accommodated by one of the wireless communication device or the logical network.

13. The first device according to claim 9, wherein the logical network is associated with each frequency used by the wireless communication device.

14. The first device according to claim 9, wherein a plurality of frequencies used by the wireless communication device is associated with the logical network.

15. The first device according to claim 9, wherein a plurality of wireless communication devices that includes the wireless communication device is associated with the logical network.

16. The first device according to claim 9, wherein the at least one processor is further configured to generate second information which comprises association information that indicates an association of the wireless communication device with at least one of the determined first use setting of the frequency resource, or the determined second use setting of the network resource.

17. The first device according to claim 9, wherein the at least one processor is further configured to determine the second use setting of the at least one network resource based on at least one of license information or information associated with the wireless communication device.

18. The first device according to claim 17, wherein the infrastructure information further comprises at least one of an installation position of the wireless communication device or corresponding frequency information which indicates a frequency usable by the wireless communication device.

19. A method, comprising:
receiving, by a processor, infrastructure information that includes at least one of authentication information associated with a wireless communication device, wireless interface information associated with a wireless interface mounted on the wireless communication device, or antenna information associated with an antenna mounted on the wireless communication device;
determining, by the processor, one of a first use setting of at least one frequency resource of a plurality of frequency resources by the wireless communication device, or a second use setting of at least one network resource of a plurality of network resources by a logical network deployed on a physical network which is connected to the wireless communication device, to provide a wireless communication service by the wireless communication device,
wherein the determination of the second use setting of the at least one network resource is based on the infrastructure information;
requesting, by the processor, a device to determine one of the first use setting of the at least one frequency resource or the second use setting of the at least one network resource that is not determined by the processor;
determining, by the processor, in a case where a specific condition is satisfied, a change of one of the first use setting of the at least one frequency resource or the second use setting of the at least one network resource; and
requesting, by the processor, the device to determine the change of one of the first use setting of the at least one frequency resource or the second use setting of the at least one network resource that is not determined by the processor.

20. A method, comprising:
receiving, by a processor, infrastructure information that includes at least one of authentication information associated with a wireless communication device, wireless interface information associated with a wireless interface mounted on the wireless communication device, or antenna information associated with an antenna mounted on the wireless communication device;
acquiring, by the processor, information indicating a first determination result of one of a first use setting of at least one frequency resource of a plurality of frequency resources by the wireless communication device or a second use setting of at least one network resource of a plurality of network resources by a logical network deployed on a physical network connected to the wireless communication device, for providing a wireless communication service by the wireless communication device,
wherein the information is acquired from a device communicatively coupled with the processor;
determining, by the processor, one of the first use setting of the at least one frequency resource or the second use setting of the at least one network resource that is not determined via the first determination result,
wherein the determination of the second use setting of the at least one network resource is based on the acquired information and the infrastructure information; and
determining, by the processor, a change of one of the first use setting of the at least one frequency resource or the second use setting of the at least one network resource that is not determined via a second determination result received from the device.

21. A non-transitory computer-readable medium having stored thereon, computer-executable instructions that, when executed by a processor, cause the processor to execute operations, the operations comprising:
receiving infrastructure information that includes at least one of authentication information associated with a wireless communication device, wireless interface information associated with a wireless interface mounted on the wireless communication device, or antenna information associated with an antenna mounted on the wireless communication device;
determining one of a first use setting of at least one frequency resource of a plurality of frequency resources by the wireless communication device, or a second use setting of at least one network resource of a plurality of network resources by a logical network deployed on a physical network which is connected to the wireless communication device, to provide a wireless communication service by the wireless communication device, wherein the determination of the second use setting of the at least one network resource is based on the infrastructure information; and requesting a device to determine one of the first use setting of the at least one frequency resource or the second use setting of the at least one network resource that is not determined by the processor;

determining, in a case where a specific condition is satisfied, a change of one of the first use setting of the at least one frequency resource or the second use setting of the at least one network resource; and requesting the device to determine the change of one of the first use setting of the at least one frequency resource or the second use setting of the at least one network resource that is not determined by the processor.

22. A non-transitory computer-readable medium having stored thereon, computer-executable instructions that, when executed by a processor, cause the processor to execute operations, the operations comprising:

receiving infrastructure information that includes at least one of authentication information associated with a wireless communication device, wireless interface information associated with a wireless interface mounted on the wireless communication device, or antenna information associated with an antenna mounted on the wireless communication device;

acquiring information indicating a first determination result of one of a first use setting of at least one frequency resource of a plurality of frequency resources by the wireless communication device or a second use setting of at least one network resource of a plurality of network resources by a logical network deployed on a physical network connected to the wireless communication device, for providing a wireless communication service by the wireless communication device, wherein the information is acquired from a device communicatively coupled with the processor; and determining one of the first use setting of the at least one frequency resource or the second use setting of the at least one network resource that is not determined via the first determination result, wherein the determination of the second use setting of the at least one network resource is based on the acquired information and the infrastructure information; and determining a change of one of the first use setting of the at least one frequency resource or the second use setting of the at least one network resource that is not determined via a second determination result received from the device.

* * * * *